United States Patent

[11] 3,599,091

[72] Inventor Charles D. Warner, Jr.
Los Gatos, Calif.

[21] Appl. No. 869,308
[22] Filed Oct. 24, 1969
[45] Patented Aug. 10, 1971
[73] Assignee Computer Synectics, Inc.
Santa Clara, Calif.

[54] SYSTEM UTILIZATION MONITOR FOR COMPUTER EQUIPMENT
10 Claims, 27 Drawing Figs.

[52] U.S. Cl. .......... 324/73, 324/72.5
[51] Int. Cl. .......... G01r 15/12, G01r 31/02
[50] Field of Search .......... 324/68 C, 73, 72.5, 126, 158; 235/153

[56] References Cited

OTHER REFERENCES

IBM Tech. Discl. Bul. - Templeman - Vol. 11 #9. Feb. 1969. Copy in 324/72.5

IBM Tech. Dis. Bul. Vol. 12 #4. Nash et al. Sept. 1969. Copy in 235/153. Pgs. 629— 630.

IEEE Trans. Computers; Vol. C-17. #7, July 1968; Sellers et al.; pgs. 676— 681. Copy in 235/153

*Primary Examiner*—Alfred E. Smith
*Attorney*—Jack M. Wiseman

ABSTRACT: Apparatus for monitoring the utilization of computer equipment wherein the presence or absence of digital signals are measured for both duration of events and the number of event occurrences. An isolation probe within an input section senses digital signals in a computer system without imposing line loading and without degrading system performance for transmission to a Boolean logic circuit, which produces logical combinations of the digital input signals. The logic circuit feeds the logical combinations of the digital input signals to counters for accumulation and display. Magnetic tape recording equipment records periodically the information contents of the counters, which are processed by computer equipment to produce numeric and graphic forms of the recorded information contents.

INVENTOR
CHARLES D. WARNER, JR.
BY Jack M. Wiseman
Thomas Schatzel
ATTORNEYS

INVENTOR.
CHARLES D. WARNER, JR.

BY John M. Wiener
Thomas Schatzel
ATTORNEYS

INVENTOR
CHARLES D. WARNER, JR.
BY [signature] [signature]
ATTORNEYS

INVENTOR
CHARLES D. WARNER, JR.
BY Jack M. Wiseman
Thomas L. Schatzel
ATTORNEYS

INVENTOR.
CHARLES D. WARNER, JR.
BY [signature]
ATTORNEYS

BOOLEAN LOGIC PLUGBOARD

INVENTOR
CHARLES D. WARNER, JR.
BY Jad M. Wisen
Thomas Schatzel
ATTORNEYS

INVENTOR
CHARLES D. WARNER, JR.
BY Jack M. Wiseman
ATTORNEYS

INVENTOR
CHARLES D. WARNER, JR.

BY Jack M. Wiseman
Thomas Schatzel
ATTORNEYS

PATENTED AUG 10 1971 3,599,091

SHEET 09 OF 19

INVENTOR.
CHARLES D. WARNER, JR.
BY [signature]
[signature]
ATTORNEYS

INVENTOR
CHARLES D. WARNER, JR.

BY

ATTORNEYS

INVENTOR
CHARLES D. WARNER, JR.

BY Jack M. Wiseman
Thomas Schatzel

ATTORNEYS

INVENTOR.
CHARLES D. WARNER, JR.
BY
ATTORNEYS

INVENTOR.
CHARLES D. WARNER, JR.
BY [signature] [signature]
ATTORNEYS

INVENTOR
CHARLES D. WARNER, JR.
BY
ATTORNEYS

INVENTOR
CHARLES D. WARNER, JR.
BY Jack M. Wiseman
Thomas Schatzel
ATTORNEYS

INVENTOR.
CHARLES D. WARNER, JR.
BY [signature]
[signature]
ATTORNEYS

SYSTEM UTILIZATION MONITOR FOR COMPUTER EQUIPMENT

BACKGROUND OF THE INVENTION

In computer management, it is necessary to measure system utilization to assess system performance and the degree of system potential being realized. Within computer equipment installations there are various basic questions such as: is the configuration adequate to installation needs, are the I/0 resources well-balanced, how much time does the system spend in Wait State and why, can the job mix be improved, how can the number of time-sharing users be increased, does the system need upgrading, is the system capable of supporting multiprogramming?

Heretofore, operators of computer equipment lacked apparatus with which to ascertain whether full system utilization was being achieved without imposing line loading and without degrading system performance.

SUMMARY OF THE PRESENT INVENTION

The present invention relates in general to monitoring apparatus for computer equipment, and more particularly to apparatus for monitoring the system utilization of computing equipment without imposing line loading on the computer equipment and without degrading the system performance of the computer equipment.

The apparatus of the present invention serves to supply to operators of computer equipment the information of data required to optimize system performance. By monitoring the computer system components simultaneously, operating information on variables that affect the performance of the computing system is obtained. The apparatus is adapted to measure both the time duration of events and the number of events occurring during prescribed times. Monitoring may be conducted on any signal line and accomplished without imposition of line loading and without degrading the performance of the computer system. A magnetic recording system may be employed to enable storing of information over a longer period of time or at shorter intervals and with more data. The recorder preferably records the information in a digital format compatible for processing by a computer to provide results in numeric and/or graphic form.

Attachment to the host system may be realized through an input section including an isolation probe which detects the presence or absence of signals while providing isolation between the monitoring apparatus and the host system. The detected signals may in turn be received by line receivers. The input signals are then fed to a logic circuit network, e.g. Boolean logic plugboard where logical combinations of the signals are made prior to counting or timing in a counter. The available logic functions may include AND, OR, latches, SUM start and stop controls, tape controls and a hexadecimal decoder providing one out of 16 possible combinations of four binary input signals. The logic output may be received by accumulator and display means to record and store the accumulated data and produce therefrom visible information data.

DESCRIPTION OF THE PREFERRED EMBODIMENT

Figure 1:
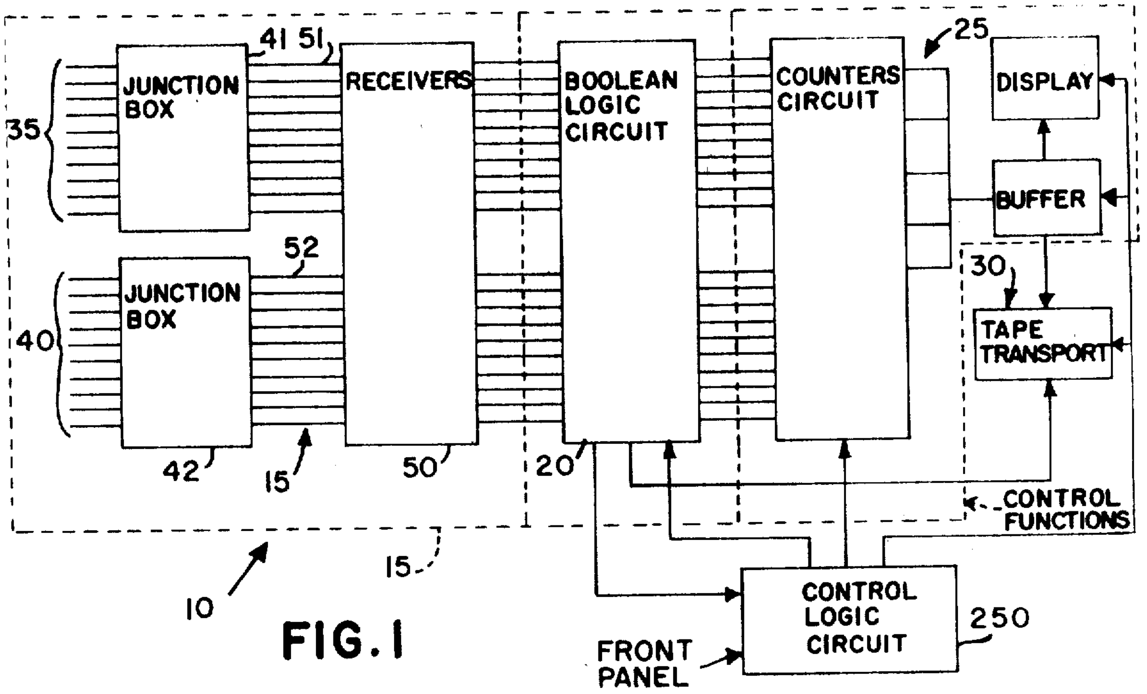
FIG. 1 is a block diagram of the electrical circuit for the apparatus of the present invention.

FIG. 1 illustrates apparatus of the present invention referred to by the general reference character 10, for monitoring the utilization of computer equipment. The apparatus 10 comprises an input section 15 which senses the presence or absence of digital signals within a conventional computer system, not shown. Toward this end, the input section 15 detects simultaneously a plurality of digital signals within the conventional computer system and senses both the duration of the digital signals and the frequency of occurrence of the digital signals.

Connected to the input section 15 is a Boolean logic circuit 20, which serves to form logical combinations of the digital signals fed thereto by the input section 15. The output of the Boolean logic circuit 20 is transmitted to a counter network 25 for accumulation and display. The data information within the counter 25 is recorded by a magnetic tape transport 30, which records the data information of the counters and forwards the data information into computer equipment to produce numeric and graphic forms of the recorded information contents. The tape transport may be a seven- or nine-track 200, 556 or 800 bpi, or nine-track 1,600 bpi magnetic tape unit.

The input section 15 comprises a plurality of isolation probes 35 and a plurality of similar isolation probes 40. Connected to the isolation probes 35 is a conventional junction box 41 and connected to the isolation probes 40 is a conventional junction box 42. A line receiver network 50 comprising a plurality of conventional line receivers is connected to the output of the junction boxes 41 and 42 by means of a pair of cable networks 51 and 52, respectively. There is a line receiver for each of the probes.

Figure 2:
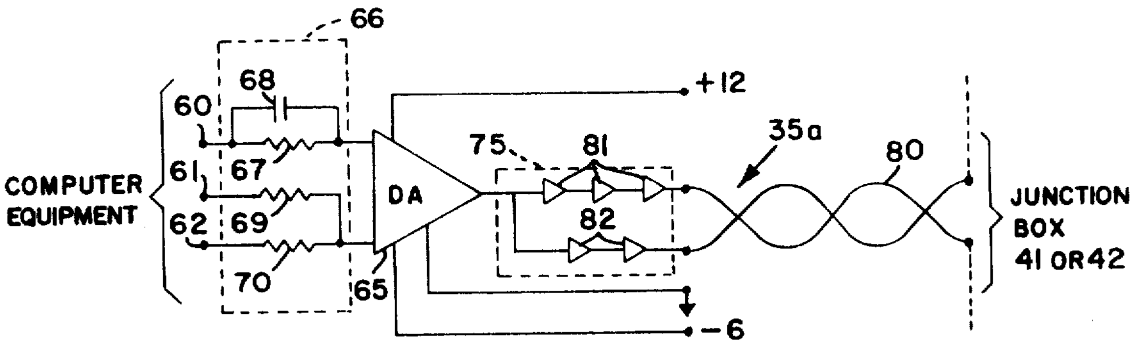
FIG. 2 is a schematic diagram of an isolation probe employed in the apparatus of the present invention.

In the exemplary embodiment herein, there are 10 probes in each of the groups 35 and 40. All of the isolation probes 35 and 40 employed in the present invention are similar in construction and in operation. FIG. 2 illustrates a probe referred to by the general reference character **35*a* representative of each of the probes of the groups 35 and 40. The isolation probe 35*a* is connected on online basis to computer equipment by frictional connection to a wire wrap pin of the computer equipment so as to sense the presence or absence of digital signals on that pin in the computer equipment. In practice, a plurality of the probes 35 and 40 are employed simultaneously so that concurrently a plurality of digital signals in the computer equipment are detected. The digital signal from the computer system is received by the isolation probe 35*a* by way of a set of probe input terminals 60, 61 and 62 and advanced to the input side of a conventional differential amplifier 65 through a passive compensating network 66. The compensating network 66 includes a resistor 67 and a capacitor 68 connected in parallel common to the input terminal 60, and a pair of resistors 69 and 70, respectively, jointed to the input terminals 61 and 62 and connected in common at one end to the input of the amplifier 65. The compensating network 66 is adapted to provide noise rejection and a balanced input for the differential amplifier 65. Thus, a high-impedance, differential input is achieved with a passive divider network which adjusts for various circuit threshold levels. The output of the differential amplifier 65 extends through a double inversion network 75 to a twisted cable pair 80 with the double inversion network driving the twisted pair 80. The double inversion network 75 includes a first set of serially connected conventional amplifiers 81 and a second set of serially connected conventional amplifiers 82**.

Through the foregoing arrangement, a balanced line is achieved without terminating in a fixed resistance and with a high noise rejection. The isolation probes of the present invention are adapted to sense digital signals in computer system without imposing line loading and without degrading the system performance. Complete isolation is achieved from the host system. In practice, the probe 35*a* is sensitive to pulses as short as 50 nanoseconds and repetition rates up to 10 MHz. The probe 35*a* can drive a signal over a shielded cable at least 100 feet in length.

Figure 3:
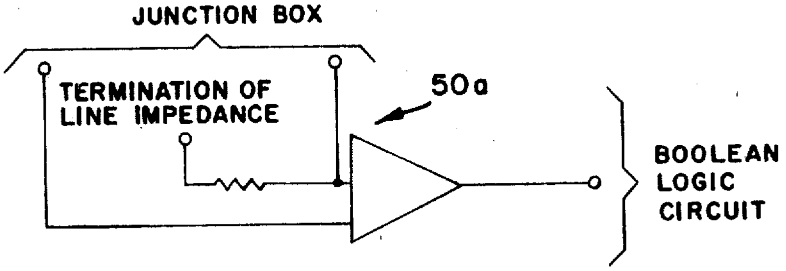
FIG. 3 is a schematic diagram of a receiver employed in the apparatus of the present invention.

The digital signals sensed by the isolation probes 35 and 40 advance through the junction boxes 41 and 42 over the groups of cables 51 and 52 to be received by the receiver network 50. For each isolation probe, there is a separate receiver within the network 50. The individual receivers of the receiver network 50 are similar in structure and operation. A typical receiver 50*a* is shown in FIG. 3.

The illustrated receiver 50*a*, similar to Models DM7820 and DM8820 manufactured by National Semiconductor Corporation, includes a pulse terminating network and a suitable amplifier. The output of the receiver 50*a* is fed to the Boolean logic circuit 20 through conventional plugboard drivers, not shown.

Figure 4A:
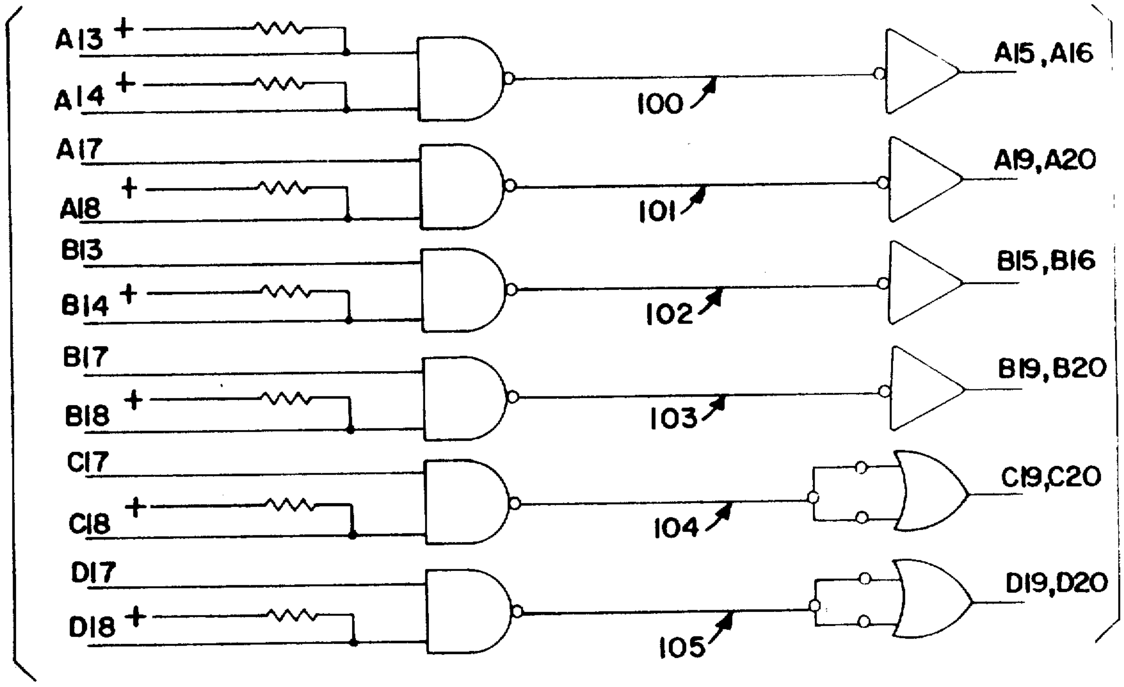
FIGS. 4A—4L are schematic diagrams of the Boolean logic circuit employed in the present invention.
Figure 4B:
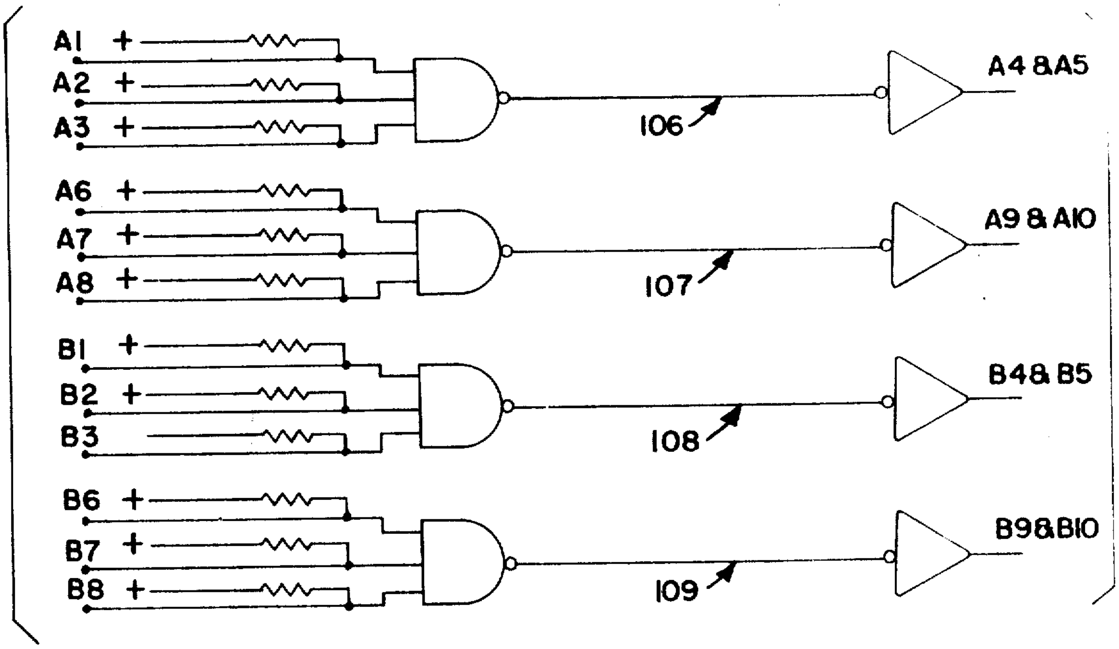
Figures 4C, 4D:
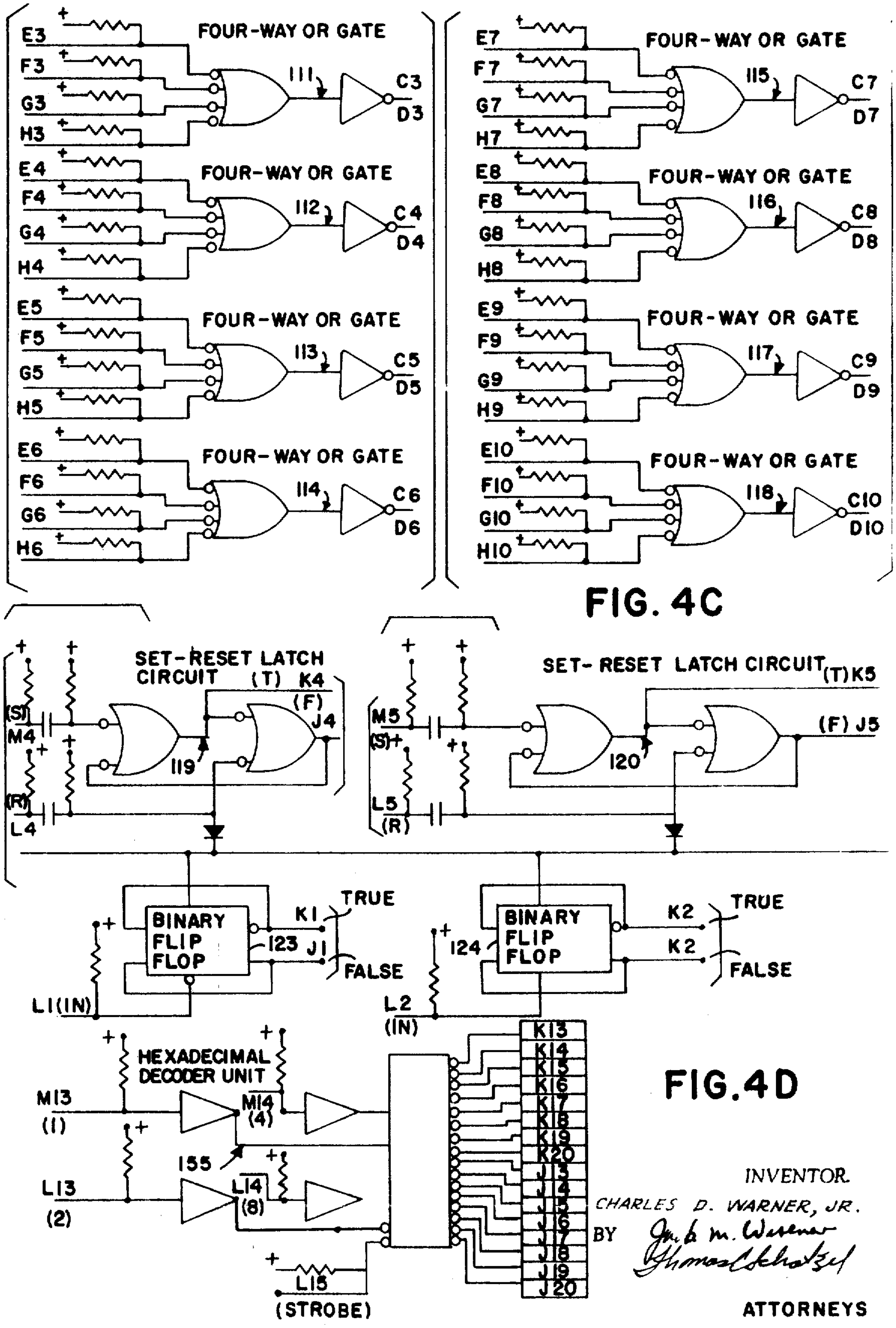
Figures 4E, 4F, 4G, 4J:
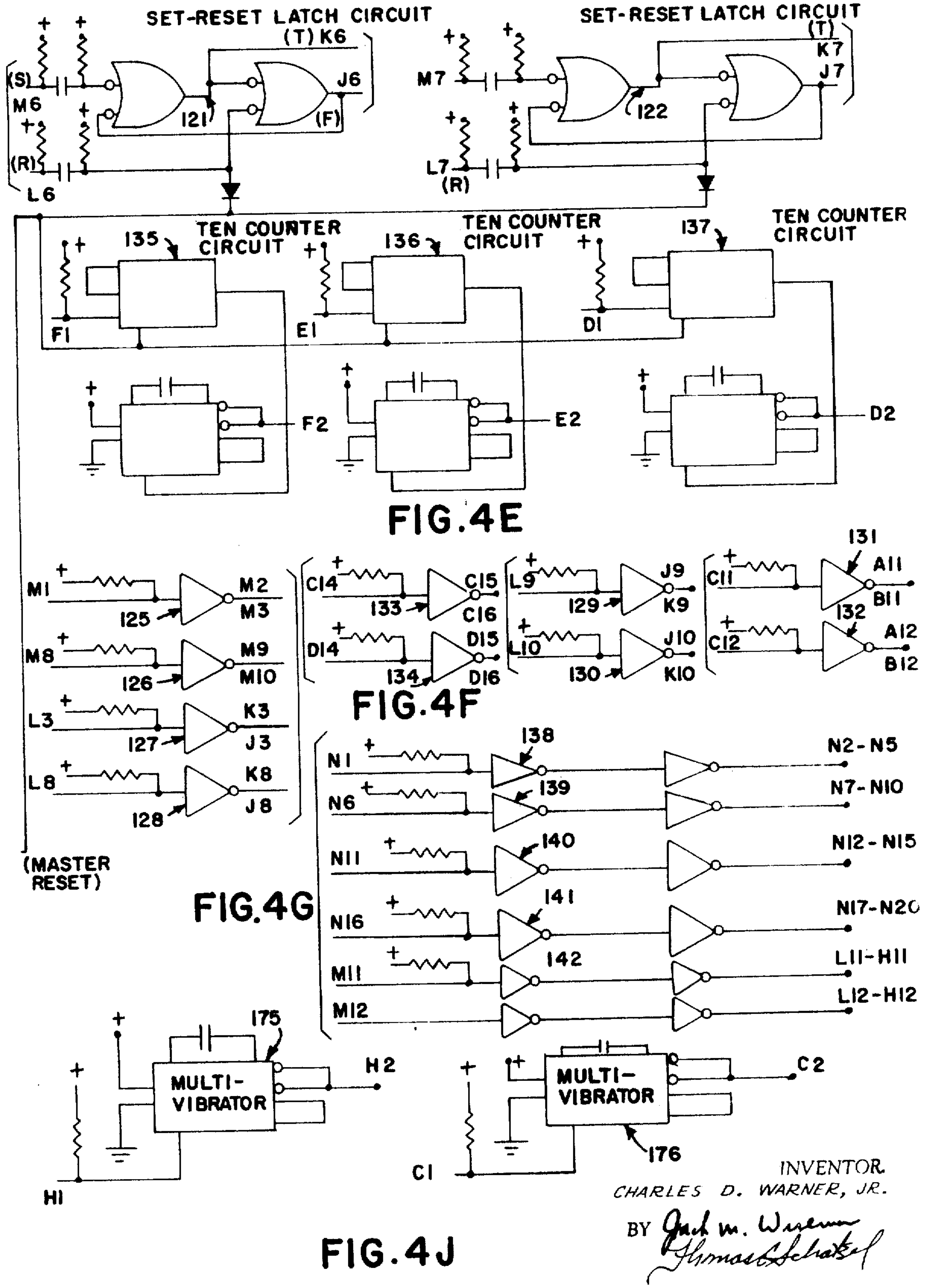
Figure 4I:
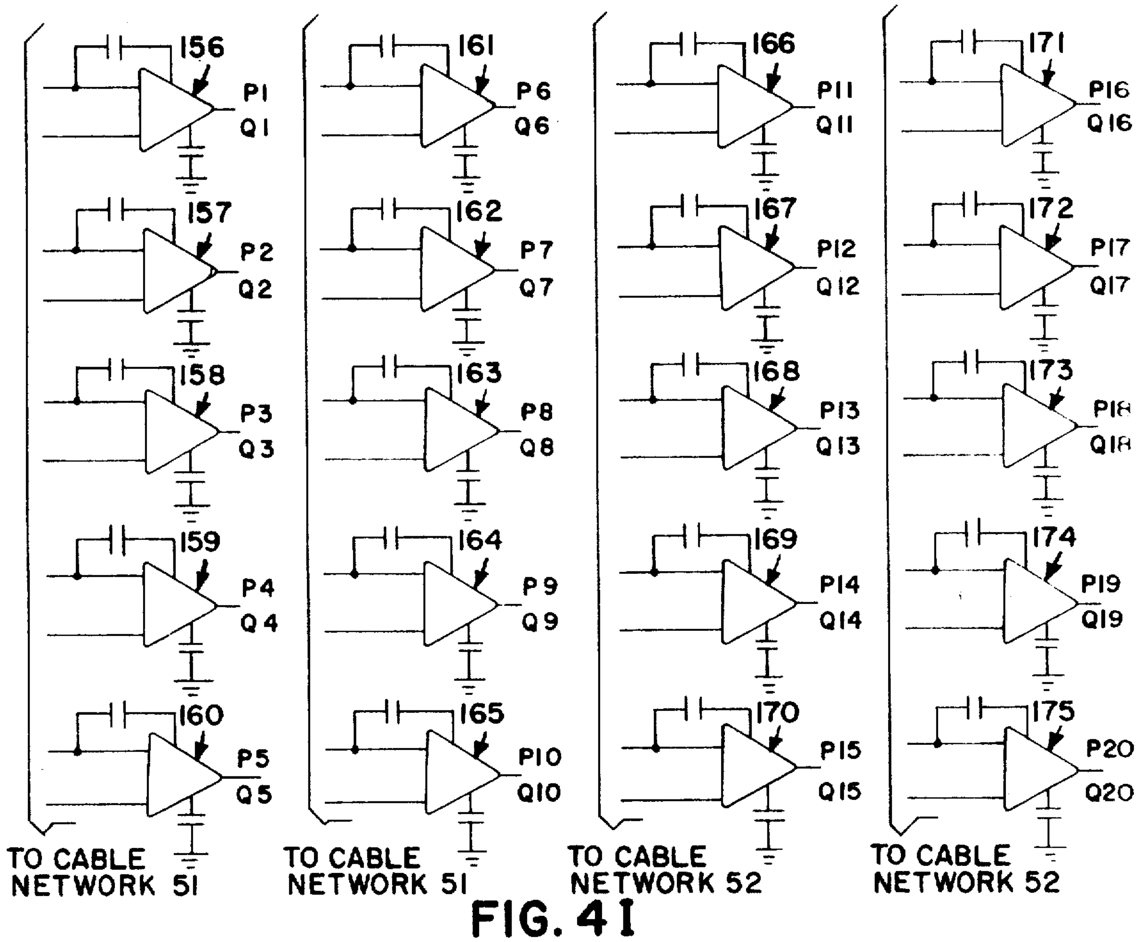

FIGS. 4A—4V depict an exemplary embodiment of the Boolean logic circuit network 20. In the exemplary embodiment, the network 20 includes various integrated circuits to perform logic functions. Preferably, the functions of the logic circuits consist of plugable logic circuits, i.e. the inputs and outputs of the circuits come from and go to a plugboard, as illustrated by the grid pattern of FIG. 4K. The plugboard controls hubs with the hub locations defined by the grid network using letters A through Q (except I and 0) and numbers 1 through 20. The purpose of the Boolean logic circuit network 20 is to perform logical combinations responsive to the signals received from the receiver network 50 prior to counting or timing in counting. All logic functions follow Boolean "true-false rules." For 20 sensor inputs into the Boolean logic circuit network 20, the available functions available on the plugboard are as follows:

| | |
|---|---|
| six two-way AND gates **100—105** | (FIG. 4A) |
| four three-way AND gates **106—109** | (FIG. 4B) |
| eight four-way OR gates **111—118** | (FIG. 4C) |
| four set-reset latches **119—122** | (FIGS. 4D and 4E) |
| two binary flip-flops **123—124** | (FIG. 4D) |
| ten inverters **125—134** | (FIG. 4F) |
| three 10-counter circuits **135—137** | (FIG. 4E) |
| six fanouts **138—143** | (FIG. 4G) |
| operational control inputs **144—154** | (FIG. 4H) |
| one hexadecimal decoder **155** | (FIG. 4D) |
| twenty sensor input networks **156—175** | (FIG. 4I) |
| two single-shot multivibrators **176—177** | (FIG. 4J) |
| sixteen two-input counters **178***a*—**178***p* | (FIG. 4L) |

All of the above logic functions are performed by standard integrated circuits, for example the DCL8000 Series Logic Elements marketed by Signetics, Inc. An operator through the plugboard terminals and plugs manually selects the logic functions desired in the Boolean logic circuit 20.

The receivers of the receiver network 50 optionally could be connected directly to the counter circuit network 25 bypassing the Boolean logic circuit network 20 or in the alternative be connected to the counter circuit network 25 through the Boolean logic circuit network 20.

The logic circuitry of the present invention employs active logic such that when a signal is present, the line is active and when a signal is not present the line is inactive. The circuit network 20 may include receiver inputs from the receiver network 50 through the input sensors 156—175. The sensors 156—175 are connected at their respective outputs to the grid positions P1—P20 and Q1—Q20 to furnish bussed distribution of the signals.

When it is desired to count all the events or occurrences happening simultaneously from the probes of the sets 35 and 40, it is an AND logic function. The two-way AND gates 100—105 (grid position A13—A16; A17—A20; B13—B16; B17—B20; C17—C20 and D17—D20) or the three-way AND gates 106—109 (grid positions A1—A5; A6—A10; B1—B5 and B6—B10) are selected dependent on the number of active input probes 35. Each of the input probes within the group 35 extends through an associated receiver 50 to one of the AND gates 100—109 through the associated input sensors of the sensors 156—175. The output of an AND gate is active only when all the inputs to that gate are active. Similarly, when it is desired to count when one or more events or occurrences are happening during a time period, which is an OR logic function, the OR gates 111—118 (FIG. 4C) are selected (grid positions C3—H3; C4—H4; C5—H5; C7—H7; C8—H8; C9—H9 and C10—H10). The output of an OR gate is active only when one or more inputs are active.

The inverter circuits 125—134 (FIG. 4F), which provide an output indication opposite from that of the input, are selected when it is desired to produce an active output from an inactive input, or conversely to produce an inactive output from an active input. The grid position for the inverters is M1—M3; M8—M10; J3—L3; J8—L8, J9—L9; J10—L10, A11—C11; A12—C12; C14—C16 and D14—D16.

When it is desired to observe the duration between two pulses, the set-reset latches 119—122 (FIGS. 4D, 4E) are employed. The grid positions for the latches are J4—M4; J5—M5; J6—M6 and J7—M7. Normally, the latches 119—122 are in the reset state. A latch is set by supplying a pulse to a set hub. Io reset the apparatus of the present invention, a MASTER RESET key may be activated or a pulse may be transmitted to the reset hubs of the plugboard for the latches 119—122 to reset the latches 119—122 collectively or individually. A pulse transmitted would cause the latches 119—122 to be in a reset state. The latches 119—122 are considered to be in a set condition when the TRUE output is active and the FALSE output is inactive. The latches 119—122 are in a reset state when the TRUE output is inactive and the FALSE output is active. When the entire set of latches 119—122 are reset collectively, through a MASTER RESET key, the apparatus 10 is reset.

For distributing or fanning out signals, the fanouts 137—142 (FIGS. 4B, 4C and 4D) are employed. When the input to a fanout is active, all the outputs therefrom are active. Likewise, when the input is inactive, all outputs are inactive.

The binary flip-flops 122 and 123 (FIG. 4D) count by two and have two states, namely: set and reset. The flip-flops 122 and 123 are in a set state when the TRUE output is active and the FALSE output is inactive. Conversely, the flip-flops 122 and 123 are in a reset state when the TRUE output is inactive and the FALSE output is active. Initially the flip-flops 122 and 123 are in the reset state. Each time a pulse is transmitted to the input of the flip-flop, its state changes. When the apparatus of the present invention is reset, either by actuating the MASTER RESET key or by supplying a pulse at the reset hub on the plugboard, the binary flip-flops 122 and 123 go to the reset state. The grid position for the flip-flops is J1—L1 and J2—L2.

The single-shot multivibrators 175 and 176 (FIG. 4J) provide an output pulse of select duration, e.g. 500 nanoseconds each time the input thereof goes from the inactive or the active state and without regard to the duration of the input pulse. The grid position is H1 and H2 and C1 and C2. The three 10-counter circuits 135—137 (FIG. 4E) provide one output pulse of select duration, e.g. 500 nanoseconds for a series of 10 input pulses. The grid position for the circuit 135—137 are F1, F2; E1, E2; and D1, D2, respectively. The function is reset by a MASTER RESET key or when the reset hub is activated.

The hexadecimal decoder 154 (FIG. 4D) provides an output of one pulse of 16 possible pulse combinations of four binary bits supplied to the input thereof. The grid positions are K13—K20 and J13—J20. The decoder output is active only when the STROBE hub is active.

Figure 4H:
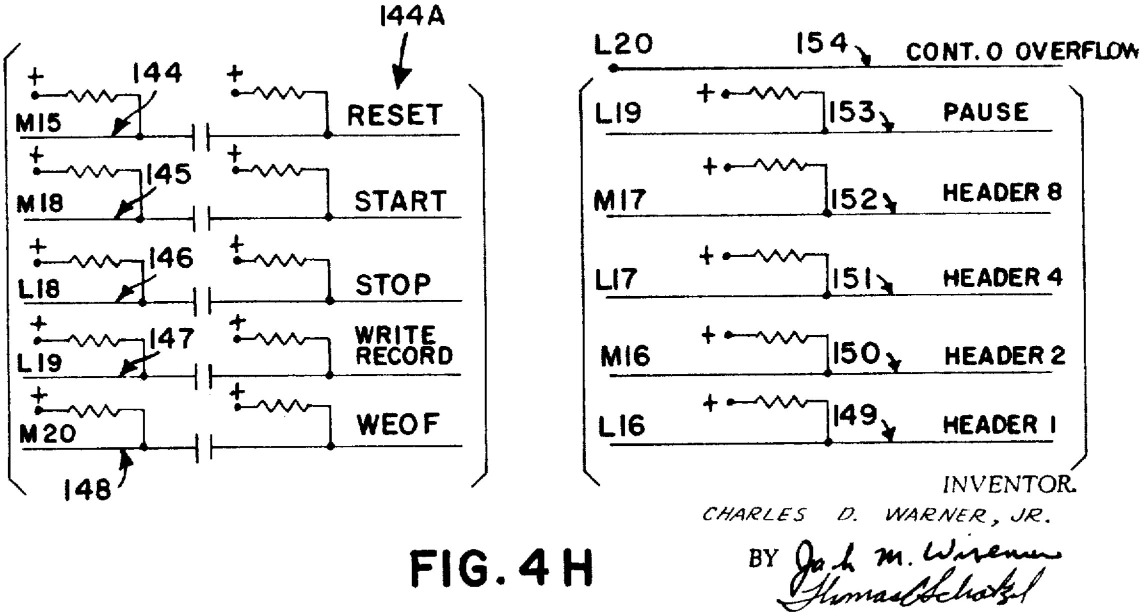
Figure 4K:
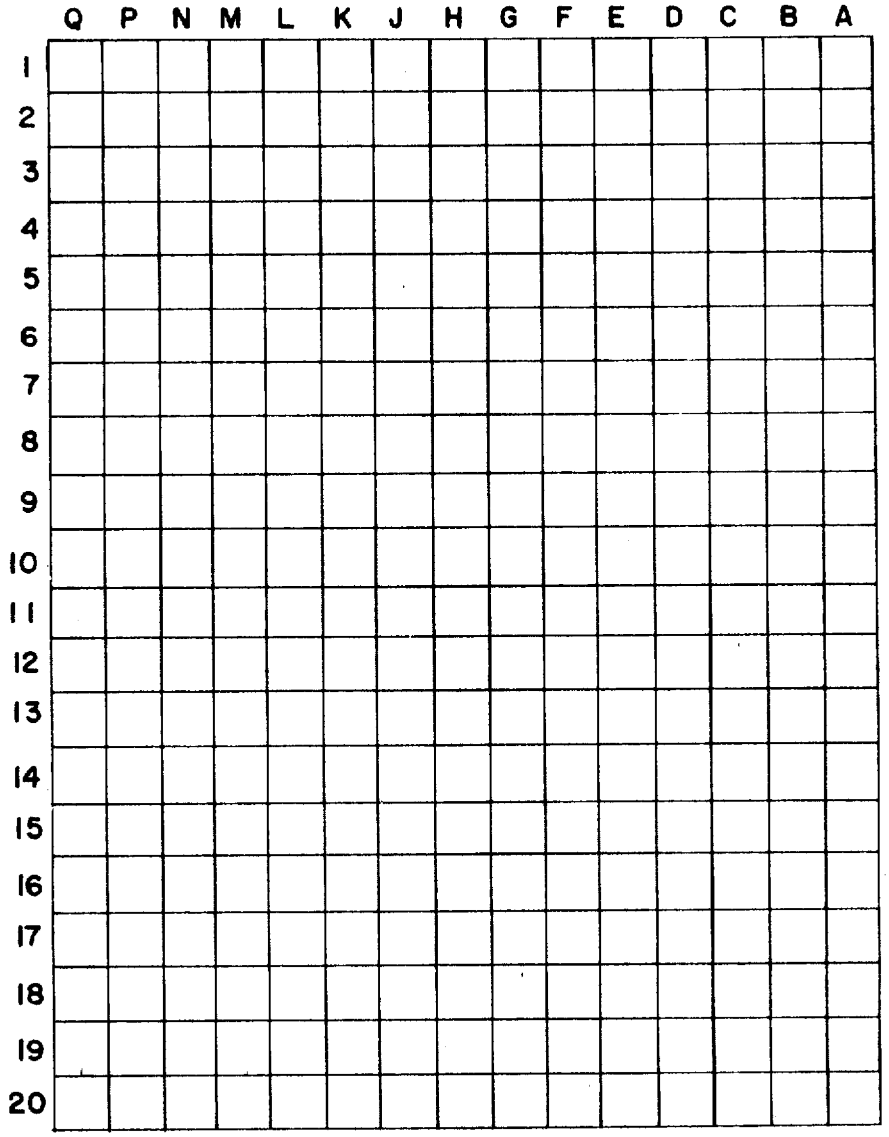
Figure 4L:
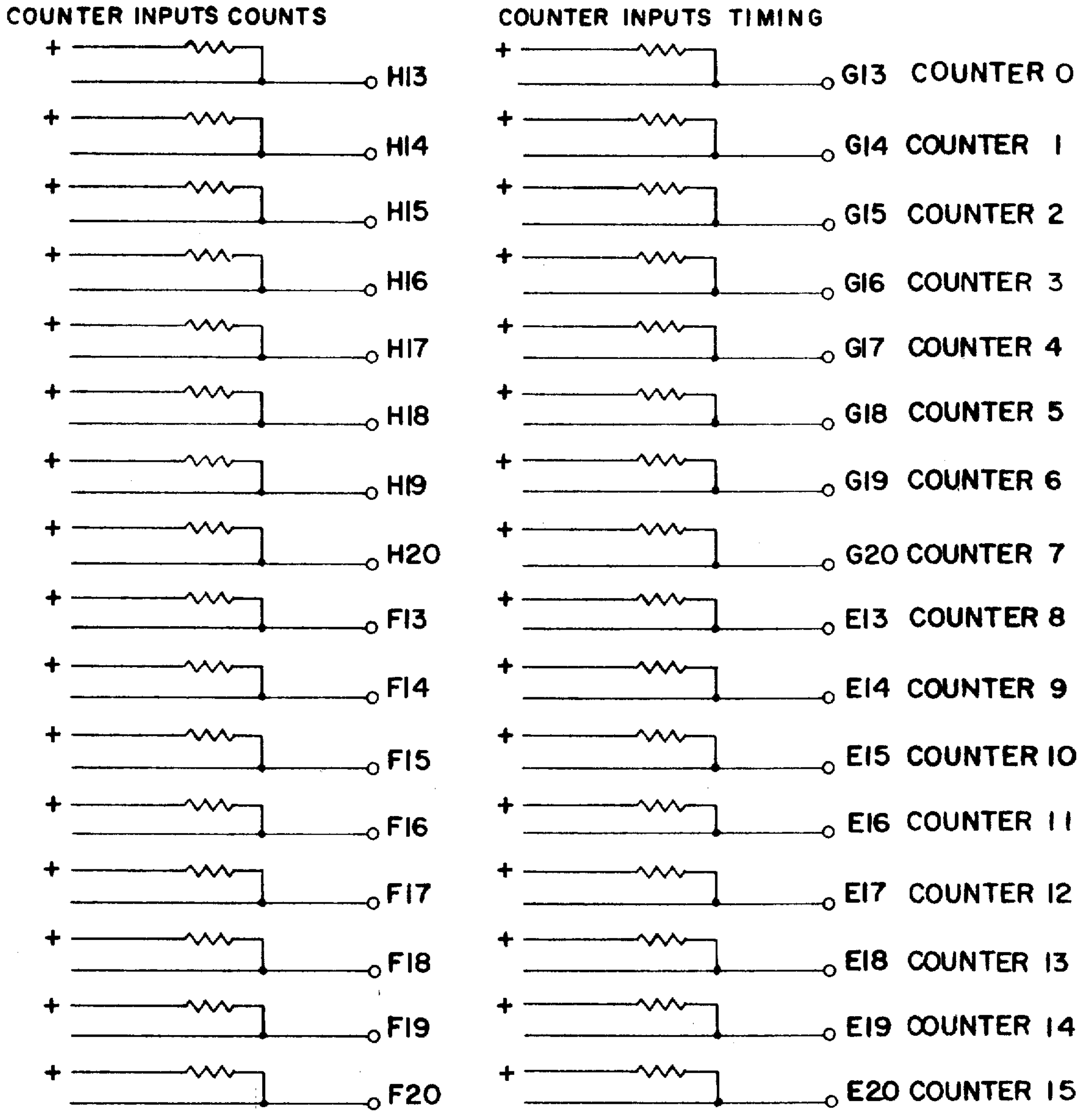

Illustrated in FIG. 4H is a control function circuit 144A, which receives input signals through the networks 144—153, respectively, for causing the following functions:

a. reset function (M15)
b. start function (M18)
c. stop function (L18)

d. write-record function (L19)
e. write end of file function (M20)
f. header 1 function (L16)
g. header 2 function (M16)
h. header 4 function L–17
i. header 8 function M–17
j. pause function L–19

Over conductor 154 is transmitted a counter zero overflow signal (20).

To count the number of occurrences of an event, the counters of counter network 25 accept input signals to each of the sixteen counters thereof. The grid positions for the counter network 25 are H13—H20 and F13—F20. The counter network 25 also accepts input signals to each of the sixteen counters thereof to time the duration of an event. The grid positions for timing are G13—G20 and E13—E20.

The counter circuit network 25 is in the form of an accumulator and display. There are 16 six-decimal digit counters each of which operates independently. Each counter can count event occurrences at a 2 MHz. rate, or time periods or durations with 1-microsecond resolution. Where resolutions at this detail are not required, the counters can be slowed to 100 kHz., 10 kHz., or 1 kHz. rate, thereby allowing a longer interval between counter loggings. The contents of one counter at a time is displayed on the panel using well-known numeric readout tubes.

FIGS. 5A—5D illustrate a six-decimal digit accumulator counter board 200 of the counter circuit network 25. Sixteen such six-decimal digit counters, all of which are similar in construction and operation are included, though only the counter 200 will be described in detail. The decade counter 200 is of conventional form such as the N8280 A micrologic element with 1-2-4-8 bcd outputs manufactured by Signetics Corporation. In the exemplary embodiment, 10 counters 201—210 are employed. Each counter includes four NAND readout gates and a decade counter, such as gates 201*a*-201*b*, 201*c*, 201*d* and a decade counter 201*e* for the decade counter 201. The counter board 200 has two modes of operation. One mode is for time duration and another mode is for number of events occurring.

The counter board 200 is programmed to read out the counters 201—210 for readout manually or to read at the counters 201—210 for readout automatically. It is the counter boards 200 that a readout in a sequential manner. It is a circuit 220 (FIG. 5D) that enables or commands the readout of the counters 201—210 of each counter board 200. The circuit 220 includes a manual control input terminal box 221 and an automatic control input terminal box 222. Connected to the input terminal 221 is a manual command readout AND gate 223 extending to an inverter circuit 224. Similarly, an automatic command readout AND gate 225 is connected to the input terminal box 222 and has its output connected to an inverter 226.

The input terminal box 221 is used solely in the manual counter select mode. Each counter receives a predetermined bcd level to indicate its selection for readout. Likewise, the input terminal box 222 is used for the automatic select mode when automatic operation is programmed. Should a preselected bcd input be applied to the input terminal box 222, then the counter board 200 associated therewith will be enabled for readout or would be commanded a readout. At the terminal box 221 is labeled MSG and the terminal box 222 is labeled ASG. These contacts are at a high or low potential dependent upon the programmed mode, i.e. whether the operation is to be manual or automatic. During the automatic mode, the contact MSG is negative and at a low potential, and the contact ASG is positive or at a high potential. Conversely, during the manual mode, the contact ASG is at a negative potential or low, and the contact MSG is at a positive potential or high.

During the manual mode on the counter board 200 that has been selected for readout, the AND gate 223 is on, the gate 225 is off and the inverter 224 has an active output. Likewise, during the automatic mode, the AND gate 225 is on, the AND gate 223 is off and the inverter 226 is active.

Dependent on whether the mode programmed is manual or automatic, the output of the "on" AND gate 223 or 225 is applied through its associated inverter 224 or 226, which is then active. Connected to the inverter 224 is an AND gate 227 and connected to the inverter 226 is an AND gate 228. Thus, either the AND gate 227 or the AND gate 228 will be "on" dependent on which associated inverter has an active or inactive output, and, hence, dependent on whether the mode programmed is manual or automatic. The AND gate 227 is enabled only when a counter gate synchronizing pulse is applied to its input terminal 229 and the AND gate 228 is enabled only when a counter gate synchronizing pulse is applied to its input terminal 230.

Connected to the output of the AND gate 227 and the AND gate 228 is an OR gate 231, which has its output fed to an AND gate 232. The input to the OR gate 231 is also common to a pair of terminals 231*a* and 231*b*. The terminal 231*a* provides a manual sync strobe signal from the AND gate 227 and the terminal 231*b* provides an automatic sync strobe signal from the AND gate 228. The AND gate 232 is enabled when a counter data strobe synchronizing pulse (CDS) is fed to its input terminal 233. The counter data strobe synchronizing pulse may be a positive going pulse of 1-microsecond duration. The output of the AND gate 232 is fed to power inverters 234 and 235.

The power inverter 234 enables or commands the decade counters 201—205 for readout simultaneously over a conductor 236 and the power inverter 235 enables or commands the decade counters 206—210 for readout simultaneously over a conductor 237. Of course, the power inverters 234 and 235 are active simultaneously.

Figure 5A:
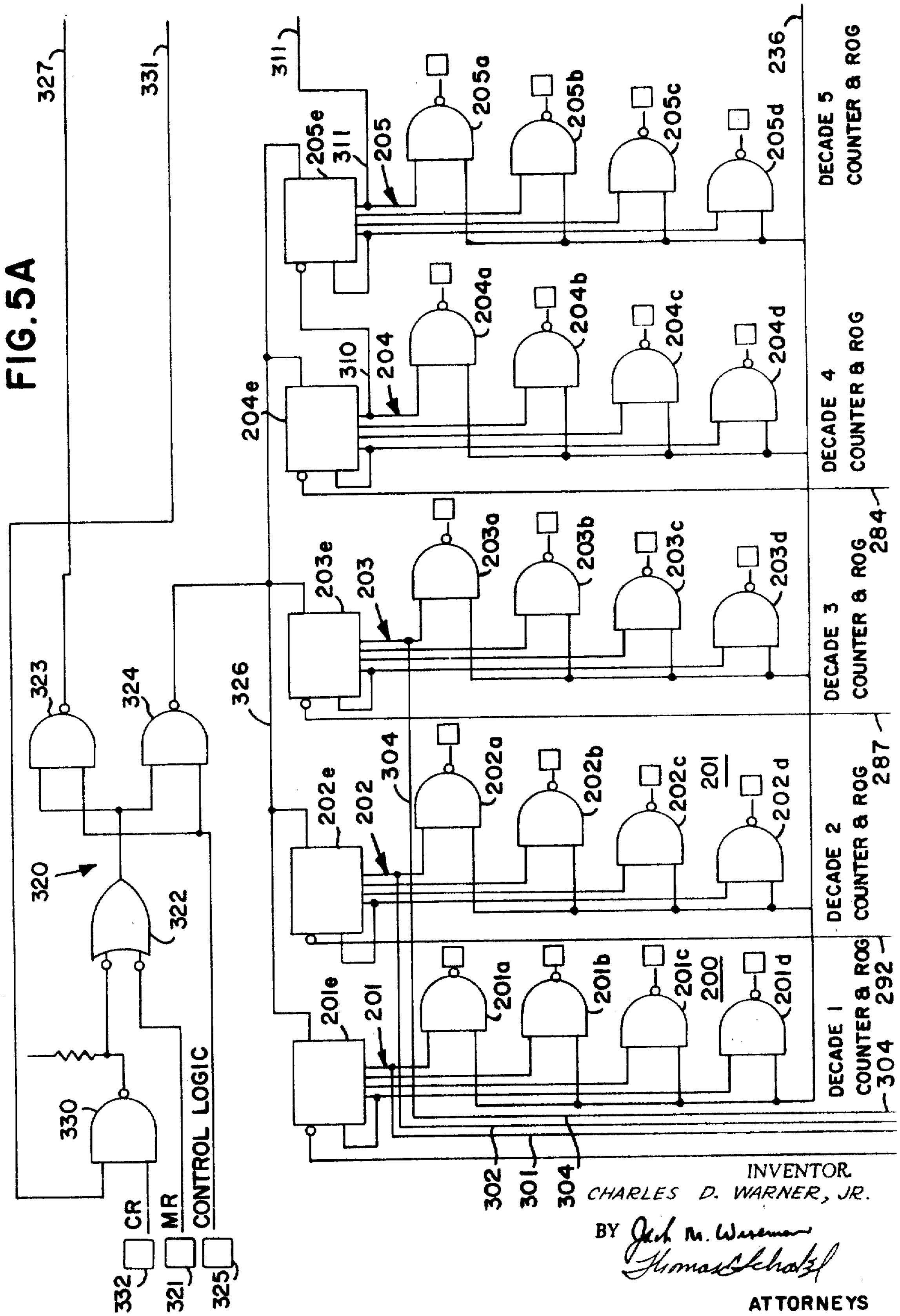
FIGS. 5A—5D are schematic diagrams of a six decimal digit counter of the counter circuit employed in the present invention.
Figure 5B:
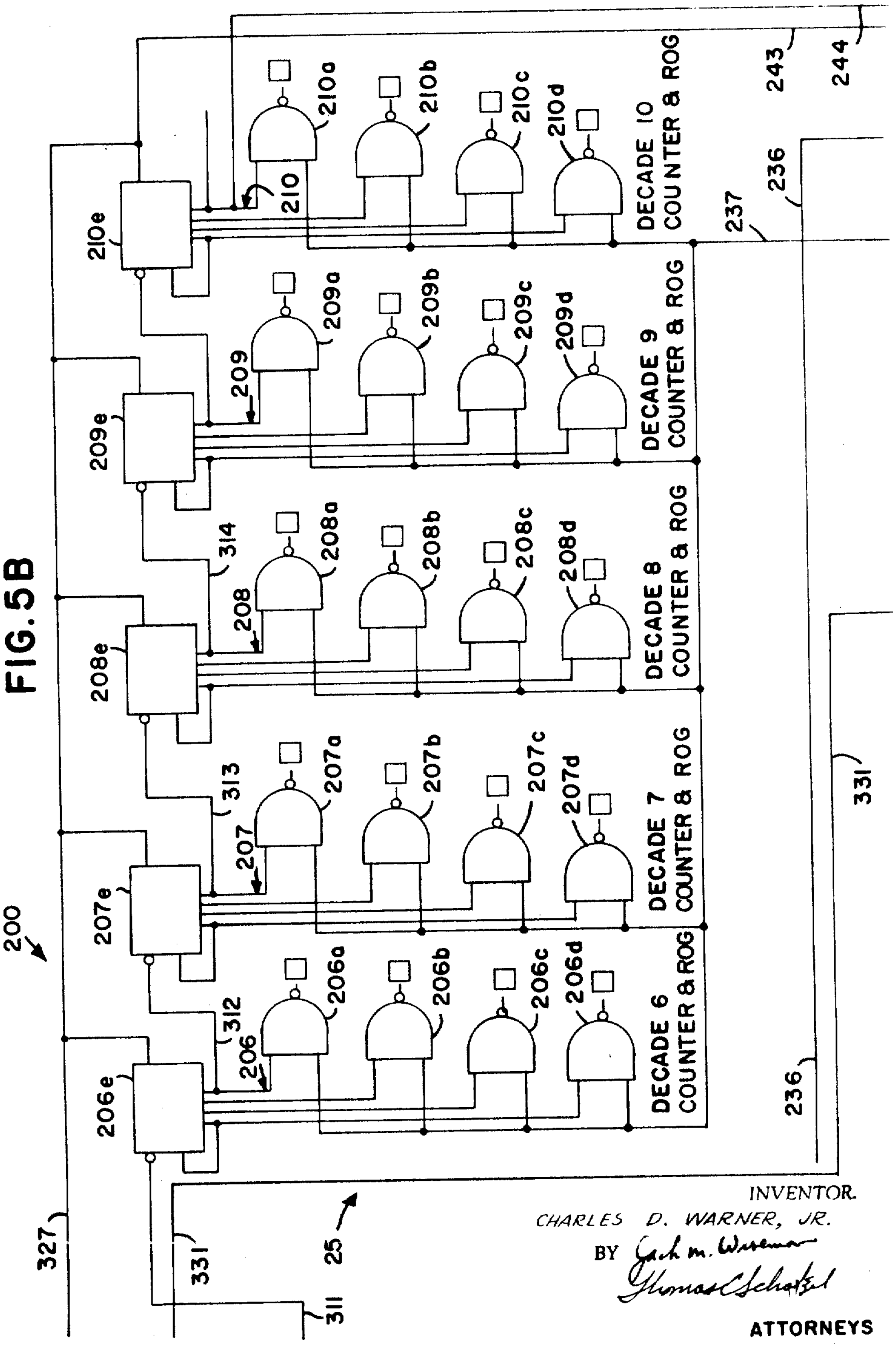
Figure 5C:
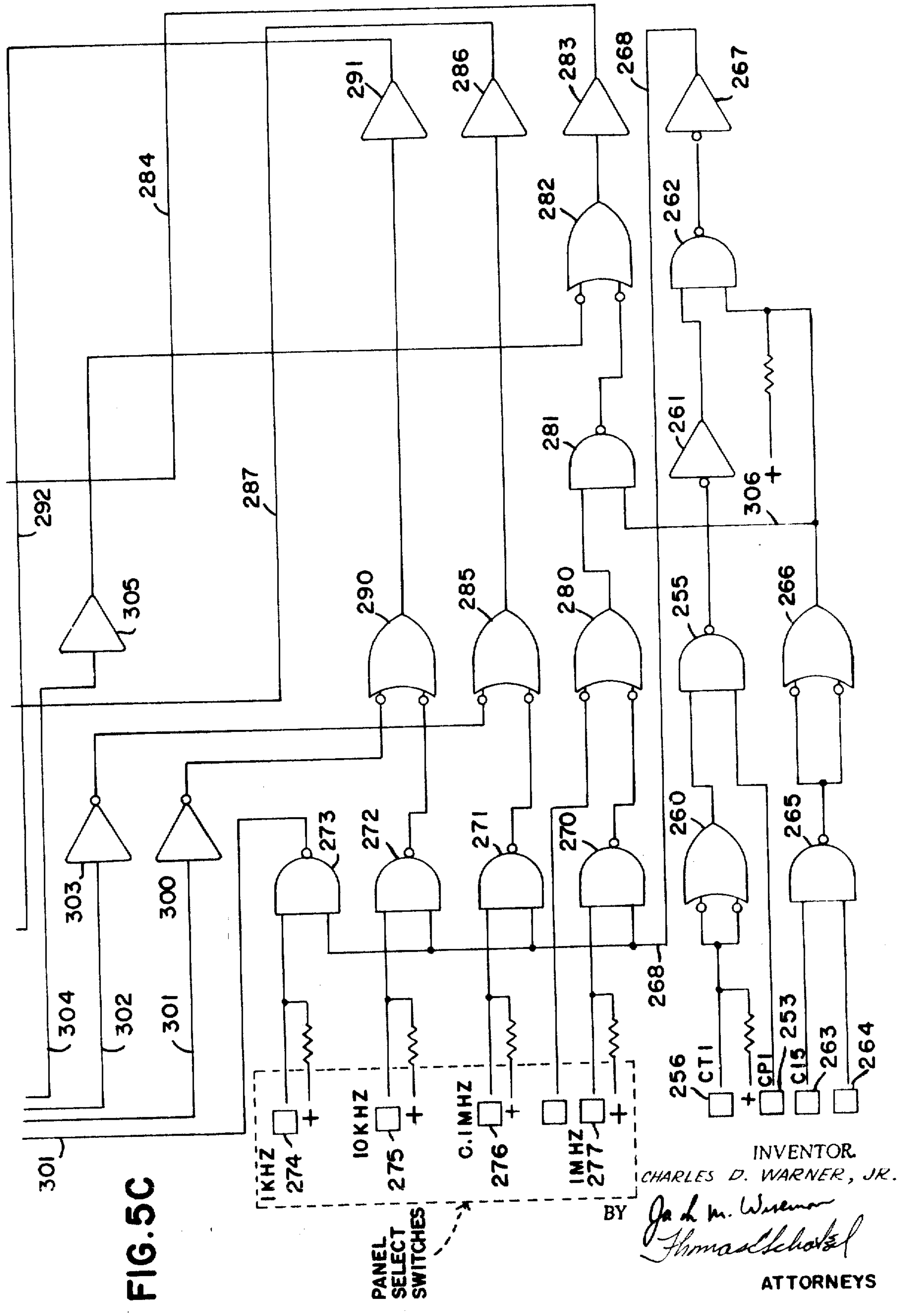
Figure 5D:
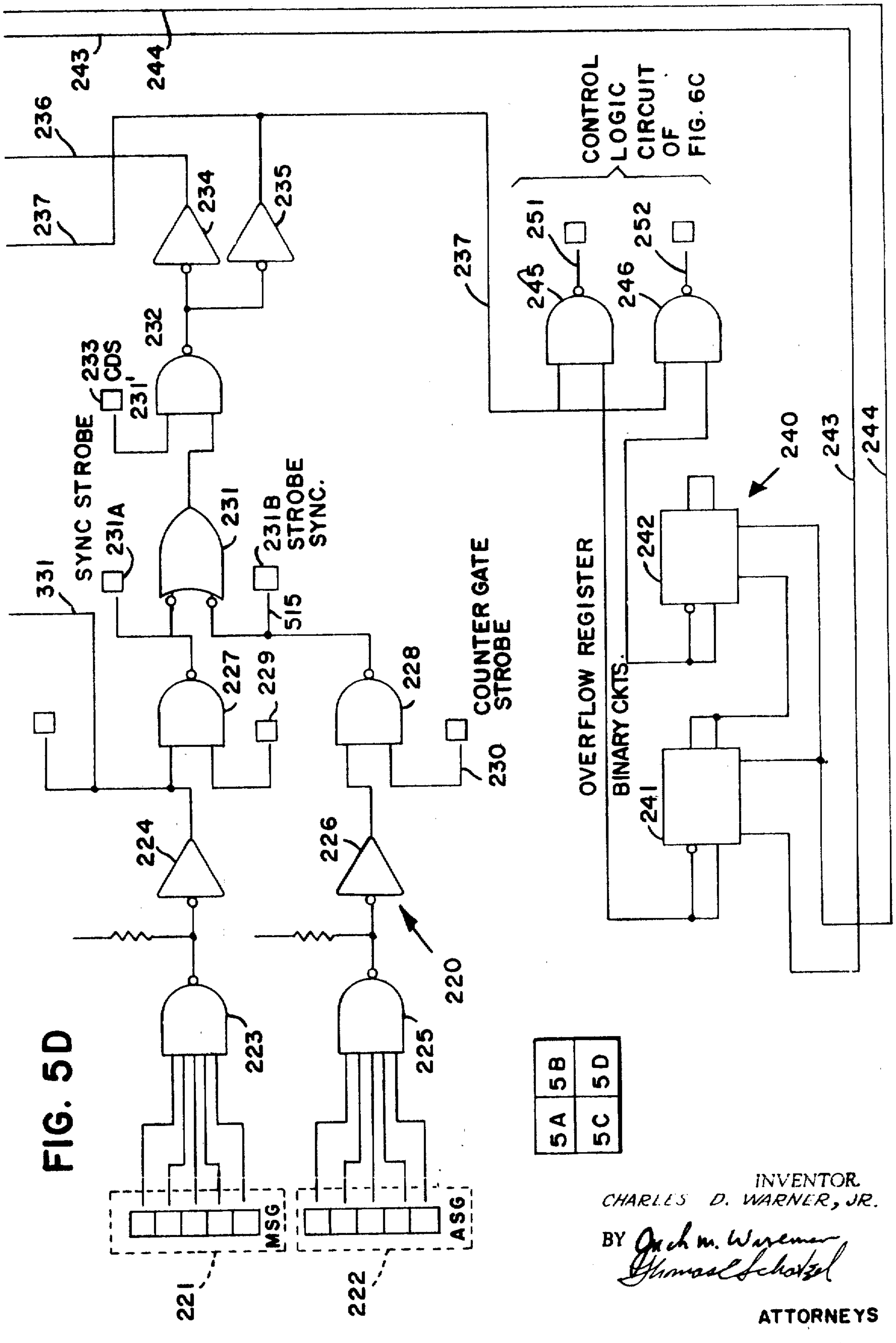

An overflow register circuit 240 is illustrated in FIG. 5D which indicates overflow for over range conditions. A pair of binary circuits 241 and 242 are connected at the input of the circuit 240 and extend to the output of the decade counter 210 (FIG. B) over a pair of conductors 243 and 244. The binary circuits 241 and 242, respectively, divide the overflow pulse by two to register overflow. An AND gate circuit 235 is connected to the output of the power inverter 235 and the binary circuit 241. An AND gate circuit 246 is connected to the output of the power inverter 235 and the output of the binary circuit 242. When the power inverter 235 is active, output pulses from the binary circuits 241 and 242 are applied through the AND gate 256 and 246 to overflow buffers in a logic control circuit 350 (FIG. 6B) common to a pair of terminals 251 and 252.

The operation of the apparatus 10 of the present invention is employed for measuring the number of events or occurrences, or measuring the time duration of the events or occurrences. Toward this end, a clock pulse input (CPI), such as 1 MHz. square wave pulse is applied at a terminal 253 (FIG. 5C). The terminal 253 is connected to the input of an AND gate 255. Thus, a clock pulse signal appearing as a positive going square wave is applied to the input side of the time duration AND gate 255. A counter timing pulse input (CTI) is applied to a terminal 256 for transmission to an OR gate 260, which operates as an inverter since the input terminals thereof are connected in common. The output of the OR gate 260 is then fed to the other input of the AND gate 255 to enable the AND gate 255 to operate in response to the time duration pulses fed to the input side thereof through the terminal 253. Thus, the time duration pulses applied to the terminal 253 are advanced through the AND gate 255 as long as counter timing pulses are applied to the terminal 256. In this manner, the duration of an event or occurrence is measured by the number of times clock pulses advance through the AND gate 255.

The output clock pulses of the AND gate 255 are fed to an inverter 261 for transmission to one input of an AND gate 262. A counter inhibit signal (CIS) can be impressed on a terminal 263 or a terminal 264 connected to an INHIBIT AND gate 265. The output of the AND gate 265 is connected to an OR gate 266, which has its input terminals connected in common to operate as an inverter. The output of the OR gate 266 is connected to the other input of the AND gate 262. As long as one counter inhibit signal is impressed on the other input of the AND gate 262, the train of clock pulses will advance through the AND gate 262.

Connected to the output of the AND gate 262 is an inverter circuit 267. The output of the inverter 267 is connected to one input, respectively, of parallel AND gates 270—273 over a conductor 268. Only one of the parallel gates 270—273 will be active or enabled at a given time and thus is controlled by counter pulse rate which is manually selected by a switch in the front panel of the apparatus 10. For example, 1 kHz. rate signal is optionally applied to a terminal 274 connected to an AND gate 273. A 10 kHz. rate signal is optionally applied to a terminal 275 connected to the AND gate 272. A 0.1 MHz. rate signal is optionally applied to a terminal 276 for feeding to the AND gate 271. A 1 MHz. rate signal may be applied to a terminal 277 for application to the input side of the AND gate 270.

If the 1 MHz. rate is selected, then the AND gate 270 is enabled and the clock pulse transmitted over the conductor 268 from the inverter 267 advances through the AND gate 270, an OR gate 280, an AND gate 281, an OR gate 282, an inverter 283, and over a conductor 284 for application to the decade counter 204.

Should the slower rate of 0.1 MHz. be selected, then the AND gate 271 is enabled and the clock pulses transmitted over the conductor 268 by the inverter 267 advances through the AND gate 271 through, an OR gate 285, an inverter 286 and over a conductor 287 for application to the decade counter 203. If a still slower rate of 10 kHz. is selected, then the AND gate 272 is enabled and the clock pulses transmitted over the conductor 268 from the inverter 267 advances through the AND gate 272, an OR gate 290, an inverter 291 and over a conductor 292 to the input of the decade counter 202. Lastly, should the rate of 1 kHz. be selected, then the AND gate 273 is enabled. By enabling the AND gate 273, clock pulses from the inverter 267 transmitted over the conductor 268 are fed to the decade counter 201.

The output pulses will be divided by the decade counters 201—203 to the proper scale so that the output from the decade counter 204 will always appear at the selected rate. Toward this end, the output of the decade counter 201 is received by an inverter 300 (FIG. 5C) joined to a conductor 301. The inverter 300 output extends to the OR gate 290. As previously described, the output of the OR gate 290 is fed to the decade counter 202 through the inverter 291 and over the conductor 292. Likewise, the output of the decade counter 202 is transmitted over a conductor 302 through an inverter 303 to the OR gate 285. As above described, the output of the OR gate 285 is fed to the decade counter 203 through the inverter 286 and over the conductor 287. The output of the decade counter 203 is fed over a conductor 304 through an inverter 305 to the OR gate 282. As above described, the OR gate 282 has its output connected to the decade counter 204 through the inverter 283 and over the conductor 284.

A counter inhibit signal applied to one of the terminals 263 or 264 (FIG. 5C) will also inhibit the operation of the OR gate 282 through the AND gate 281 joined to the OR gate 266 through a conductor 306. Again, the output of the OR gate 282 is connected to the decade counter 204 through the inverter 283 and over the conductor 284.

To count the number of events or occurrences as distinguished from time duration of the events or occurrences, the decade counters 205—209 (FIGS. 5A—5B) are connected in series or sequentially with the decade counter 205 connected to the output of the decade counter 204 over a conductor 310. The sequential operation of the decade counters 205—209 is achieved over the interconnecting output-input conductors 311—314, respectively.

A counter reset circuit 320 is shown in FIG. 5A, which can effect a reset operation by either a "master" reset or by a "-counter" reset. In a master "master"reset, all counters are reset simultaneously. By a "counter" reset, counters are reset individually. In the latter arrangement, counter-reset, select pushbuttons on the panel operate to reset one of the counter boards 200 respectively, and further selection of counter reset key serves to reset the selected counter board 200.

The master reset signal is applied to a terminal 231 in the form of a negative going pulse of approximately 10 microseconds in duration. This signal is applied through an OR gate 322 and into power AND gates 323 and 324. The second enabling signal for the AND gates 323 and 324 is derived from the control logic circuit 350 in a manner to be described hereinafter in connection with FIGS. 6A—6H. When the control logic circuit 350 applies an enabling signal to a terminal 325, the AND gates 323 and 324 of the circuit 320 are enabled. The reset pulses from the gate 324 are applied to the decade counters 201—205 over a conductor 326 and reset pulses from the gate 323 are applied to the decade counters 206—210 over a conductor 327. When the inverter 224 (FIG. 5D) is active an AND gate 330 (FIG. a) is enabled over a conductor 331 and operates when a counter reset signal is applied to a terminal 332 extending to the input of the gate 330. This action causes the AND gate 330 to operate the OR gate 322 for the transmission of reset signals from the AND gates 323 and 324 in a manner previously described.

Figure 6A:
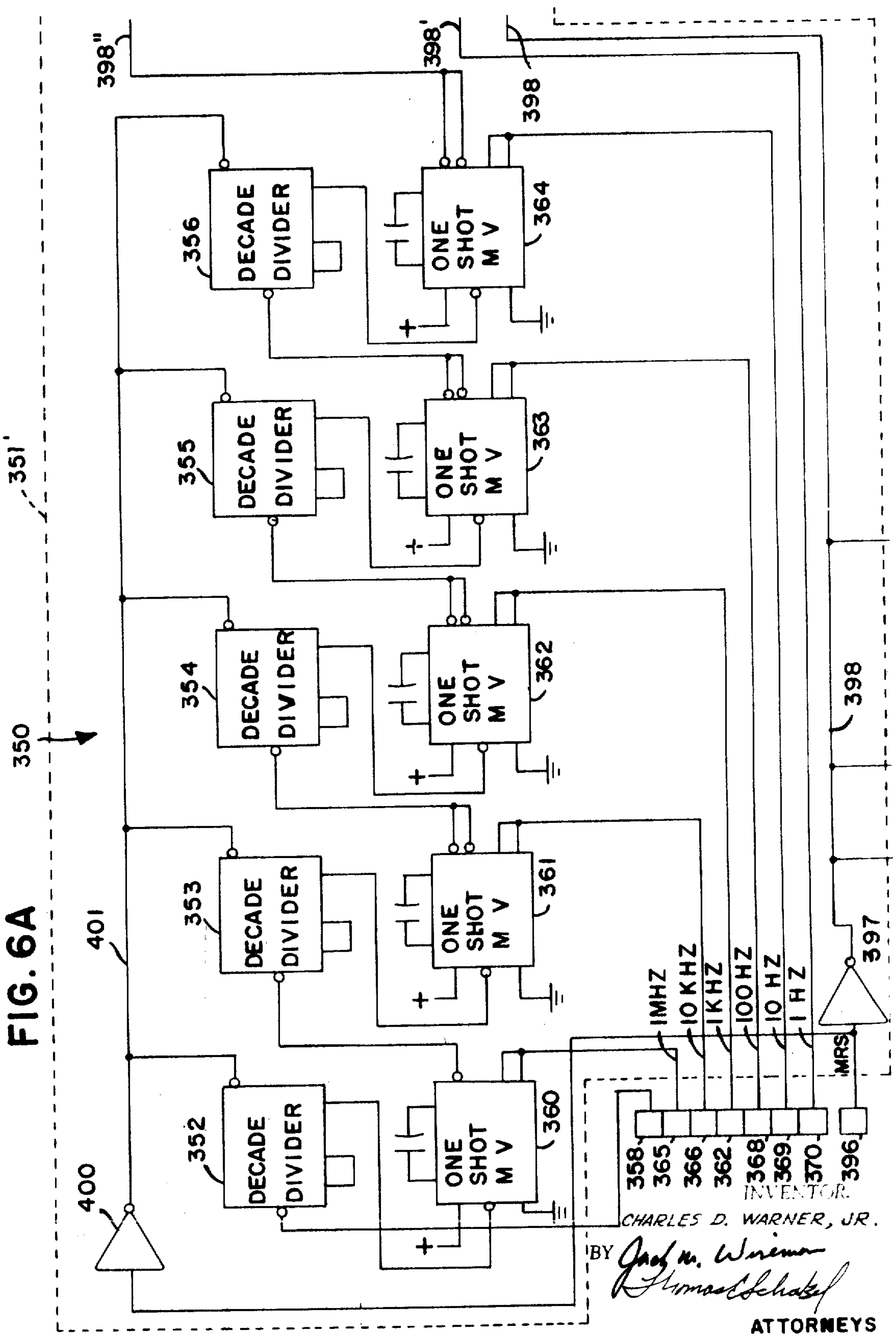
FIGS. 6A—6D are schematic diagrams of a first control circuit embodied in the control logic circuit.
Figure 6B:
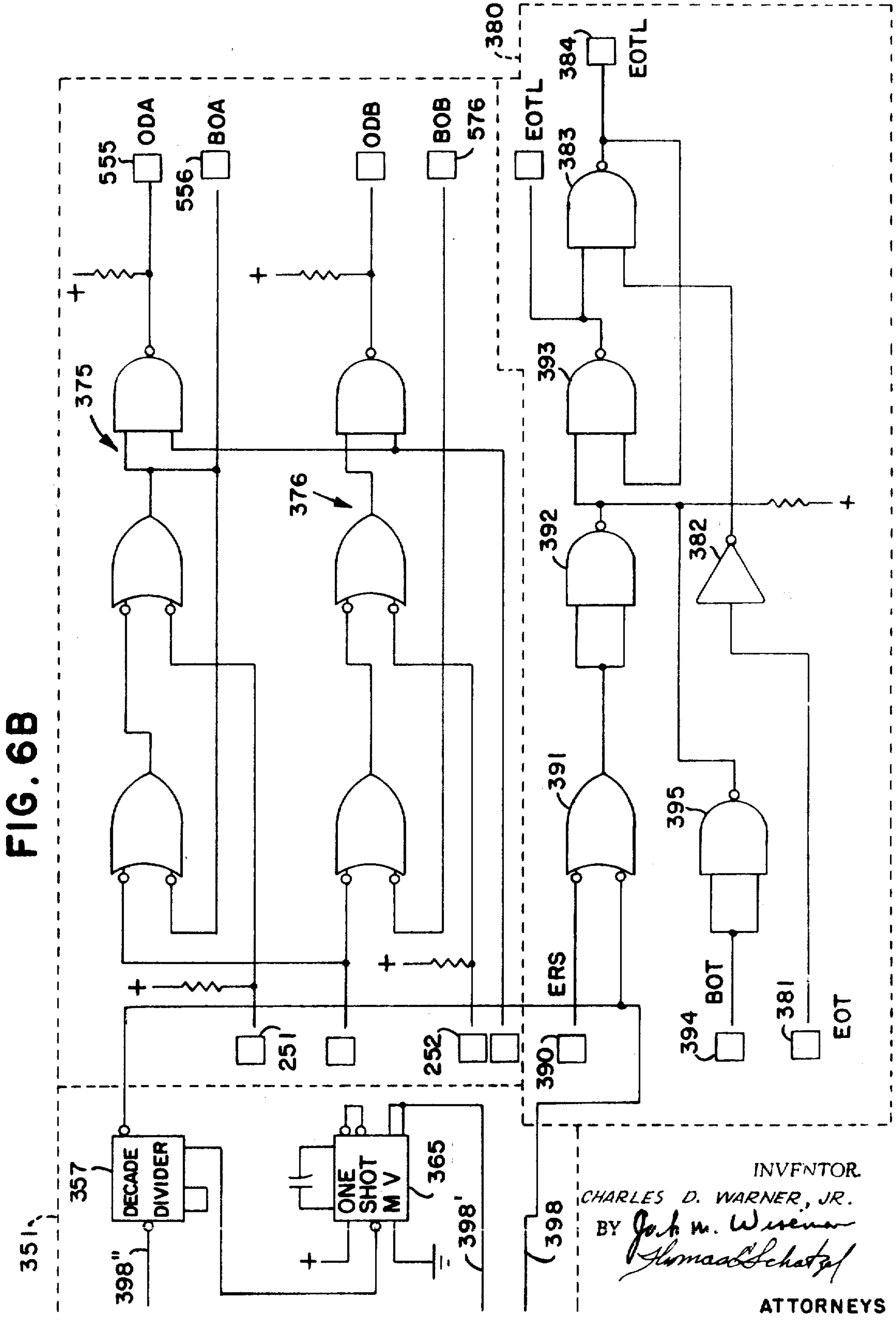

Illustrated in FIGS. 6A—6D is a control logic circuit 350, which is one of two-control logic circuits of the control logic circuit network 250. Included in the control logic circuit 350 is a clock countdown circuit illustrated in a broken line block 351 (FIGS. 6A and 6B). The countdown circuit comprises a plurality of decade dividers or divide by 10 circuits 352—357. Connected to the output of the divide by 10 circuits 352—357 are one-shot multivibrators 360—365, respectively. The multivibrators 360—365 serve to shape the pulse output from its associated decade divider and enable clock pulse outputs to operate as drive signals. The pulse length of clock pulses at the various frequencies is of a ½-duration.

Accordingly, clock pulse output of the multivibrator 360 is 1 MHz.; the clock pulse output from the multivibrator 361 is 10 kHz.; the clockpulse output from the multivibrator 362 is 1 kHz.; the clock pulse output from the multivibrator 363 is 100 Hz.; the clock pulse output from the multivibrator 364 is 10 Hz.; and the clock pulse output from the multivibrator 365 is 1 Hz. Thus, the clock pulse output for the clock countdown circuit 351 is 1 Hz. The clock pulse signals from 1 MHz. to 1 Hz. frequencies are applied to a set of output terminals 365—370, respectively.

For buffering and storing the previously maintained overflow from the overflow register circuit 240 (FIG. 5D) of the counter circuit 200, the terminals 251 and 252 are each connected to a buffer circuit 375 and 376 (FIG. 6B), respectively, which buffer circuits are similar in construction and in operation. An end of tape latch circuit 380 monitors the end of tape signal received from the magnetic tape unit 30. The end of tape signal from the magnetic tape unit 30 is applied to a terminal 381 for transmission to an inverter circuit 382. The output of the inverter circuit 382 is fed to an end of tape latch AND gate 383 from which output is produced the end of tape latch signal for application to a terminal 384.

The end of tape AND gate latch 383 can be reset in the following manner:

a. an error reset signal;

b. a beginning of tape signal; or c. a master reset signal.

The error reset signal (ERS) is applied to a terminal 390 for application to an OR gate 391, which has its output connected to an inverter circuit 392. In turn, the output of the inverter circuit 392 is fed to an AND gate 393 for resetting the end-of-tape latch AND gate 393. In a similar manner, a beginning-of-tape (BOT) signal is transmitted from the magnetic tape unit 30 for application to a terminal 394 to be applied to an inverter circuit 395. The output of the inverter circuit 395 is fed to the AND gate 393 to reset the AND gate 383. The master reset signal (MRS) is applied to a terminal 396 (FIG. 6A) and advances through an inverter circuit 397 over a conductor 398 for application to the OR gate 391. The end-of-tape latch AND gate 383 is then reset in the manner previously described for the operation from the error reset signal.

The master reset signal (MRS) applied to the terminal 396 also resets the clock countdown circuit 351 so that the clock countdown circuit 351 always starts at zero. Toward this end, the master reset signal (MRS) is advanced through an inverter circuit 400 and over a conduction 401 for resetting the decade counters 352—356. The decade counter 357 is reset by the master reset signal over the conductor 398.

Figure 6C:
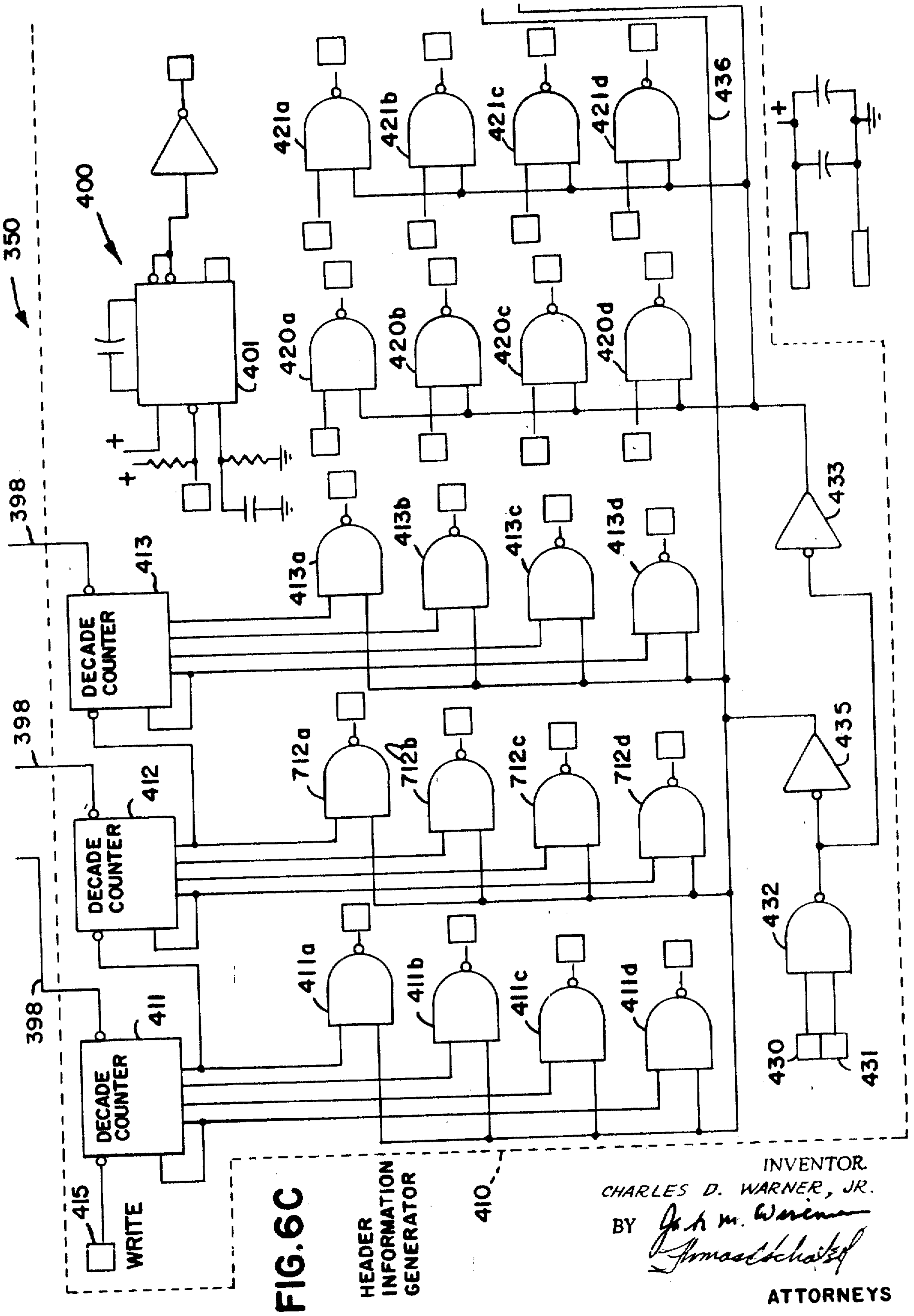
Figure 6D:
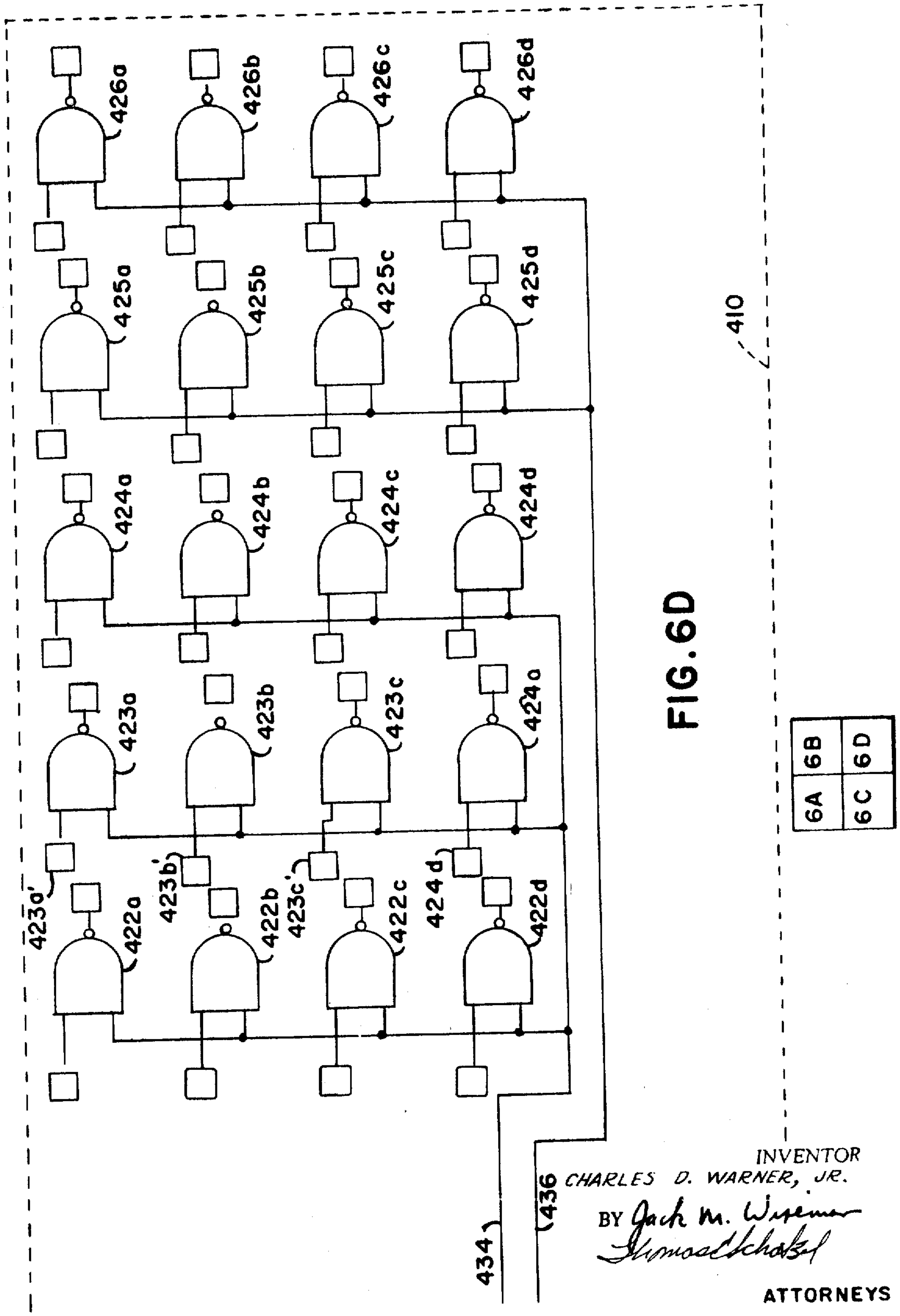

Illustrated in FIGS. 6C and 6D is a header information generator 410 of the control logic network 350. The generator comprises decade counters 411—413. Connected to the output of the decade counter 411 are a set of AND gates 411*a*—411*d*. Likewise, connected to the decade counter 413 are a set of AND gates 413*a*—413*d*. Write cycle signals are applied to a terminal 415 for application to the decade counter 411. The decade counters 411—413 are interconnected. It is the decade counters 411—413 that count the number of write cycles that have passed and present this information through the AND gates 411*a*—411*d*, 412*a*—412*d* and 413*a*—413*d* as part of the header information. The decade counters 411—413 are reset by the master reset signal applied from the terminal 396 over the conductor 398.

Also included in the information generator 410 are groups of parallel AND gates 420*a*—420*d*, 421*a*—421*d*, 422*a*—422*d*, 423*a*—423*d*, 424*a*—424*d*, 425*a*—425*d* and 426*a*—426*d*. The just-mentioned groups of parallel AND gates generate the header words. For this purpose, header character input signals from the Boolean logic circuit 20 are applied to four terminals 423*a'*—*d'* (FIG. 6C) for advancement through AND gates 423*a*—423*d*.

In FIG. 6C is illustrated a counter reset circuit 400 which includes a single-shot multivibrator 401 and an inverter 402 for resetting selected counter board 200. The input signal therefor comes from the counter reset key on the front panel.

An inverter circuit 433 is applied to the AND gates 420*a*—420*d*, 421*a*—421*d*, 422*a*—422*d*, 423*a*—423*d* and 424*a*—424 *d* over a line 436. The output of the AND gate 432 is also connected to an inverter circuit 435 for applying header character input signals to the parallel groups of AND gates 425*a*—425*d* and 426*a*—426*d* over a line 434. The output of the inverter circuits 433 and 435 cause the transfer of header signal to a buffer circuit, not shown, which is a conventional circuit for the temporary storage of signals and which transfers the temporarily stored signals to the numeric display and the tape transport 30.

Figure 7A:
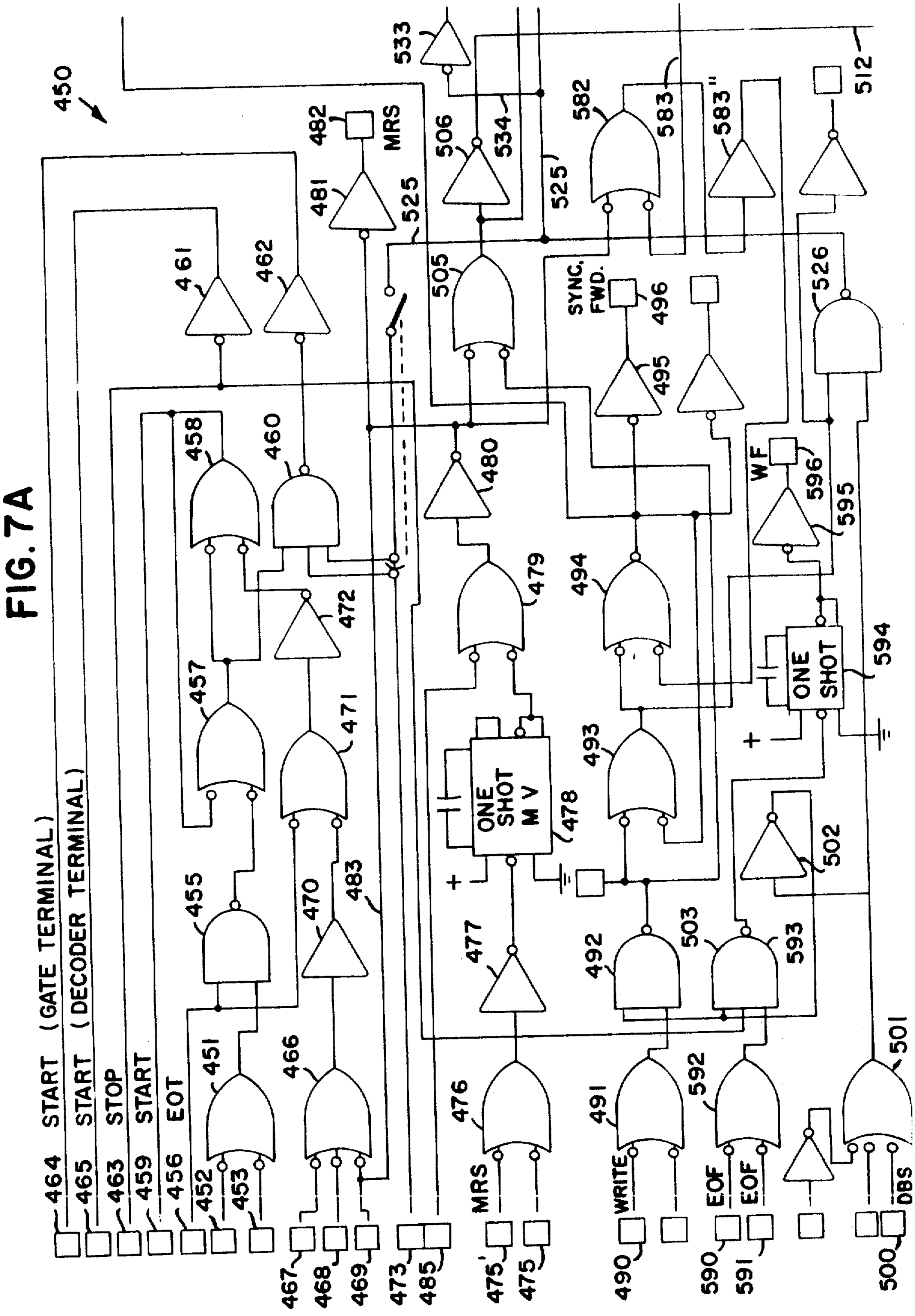
FIGS. 7A—7D are schematic diagrams of a second control circuit embodied in the control logic circuit.
Figure 7B:
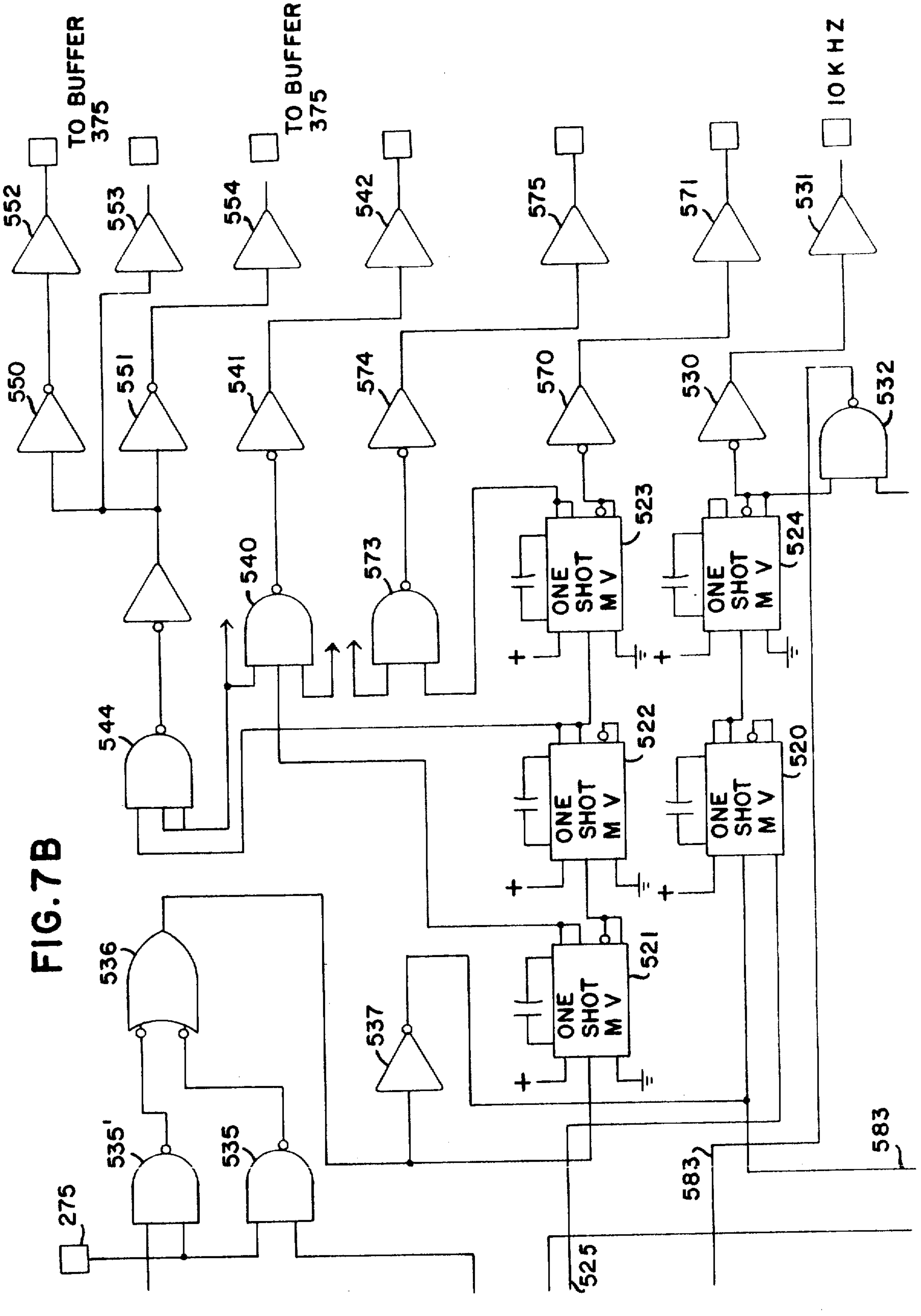
Figure 7C:
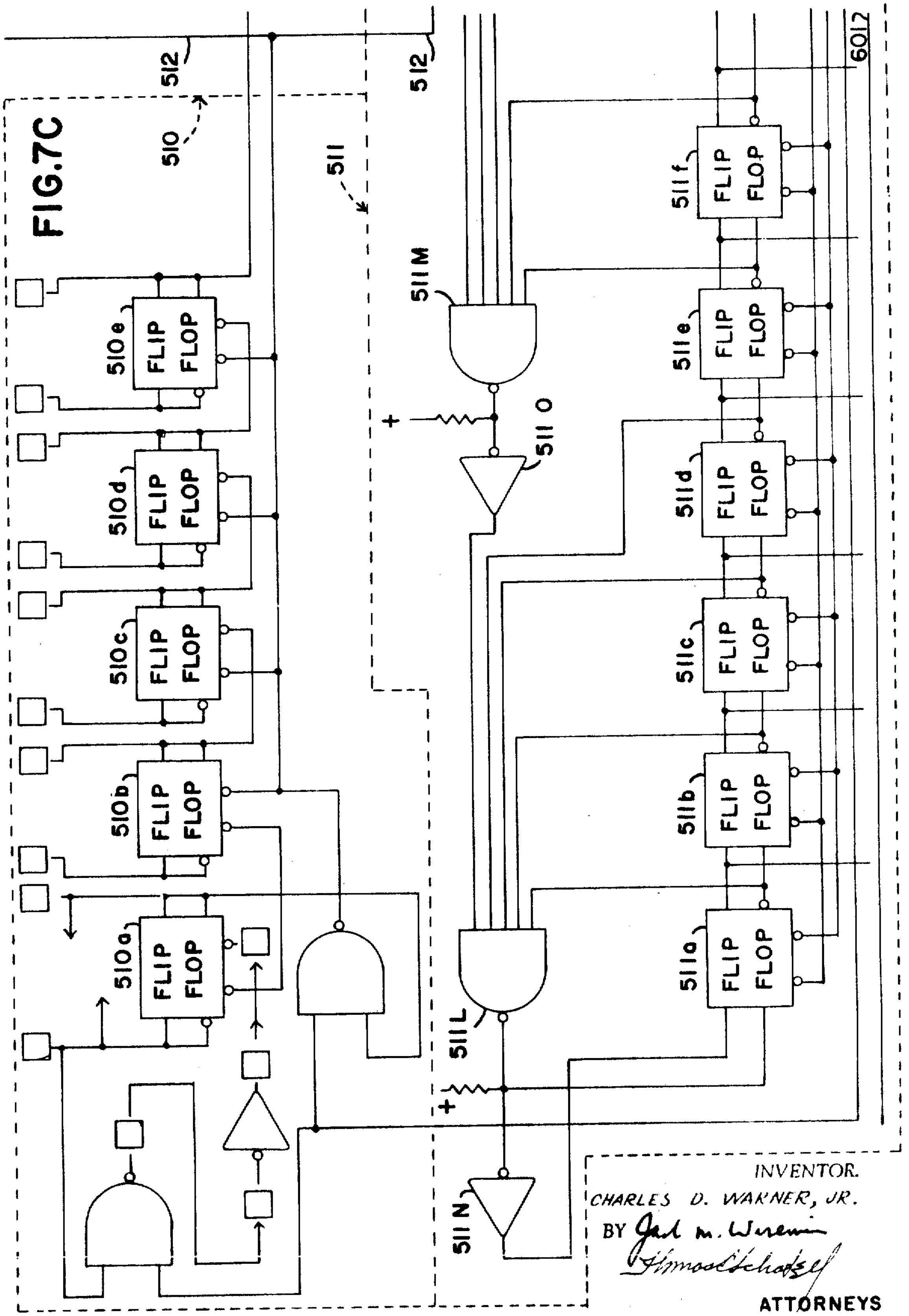
Figure 7D:
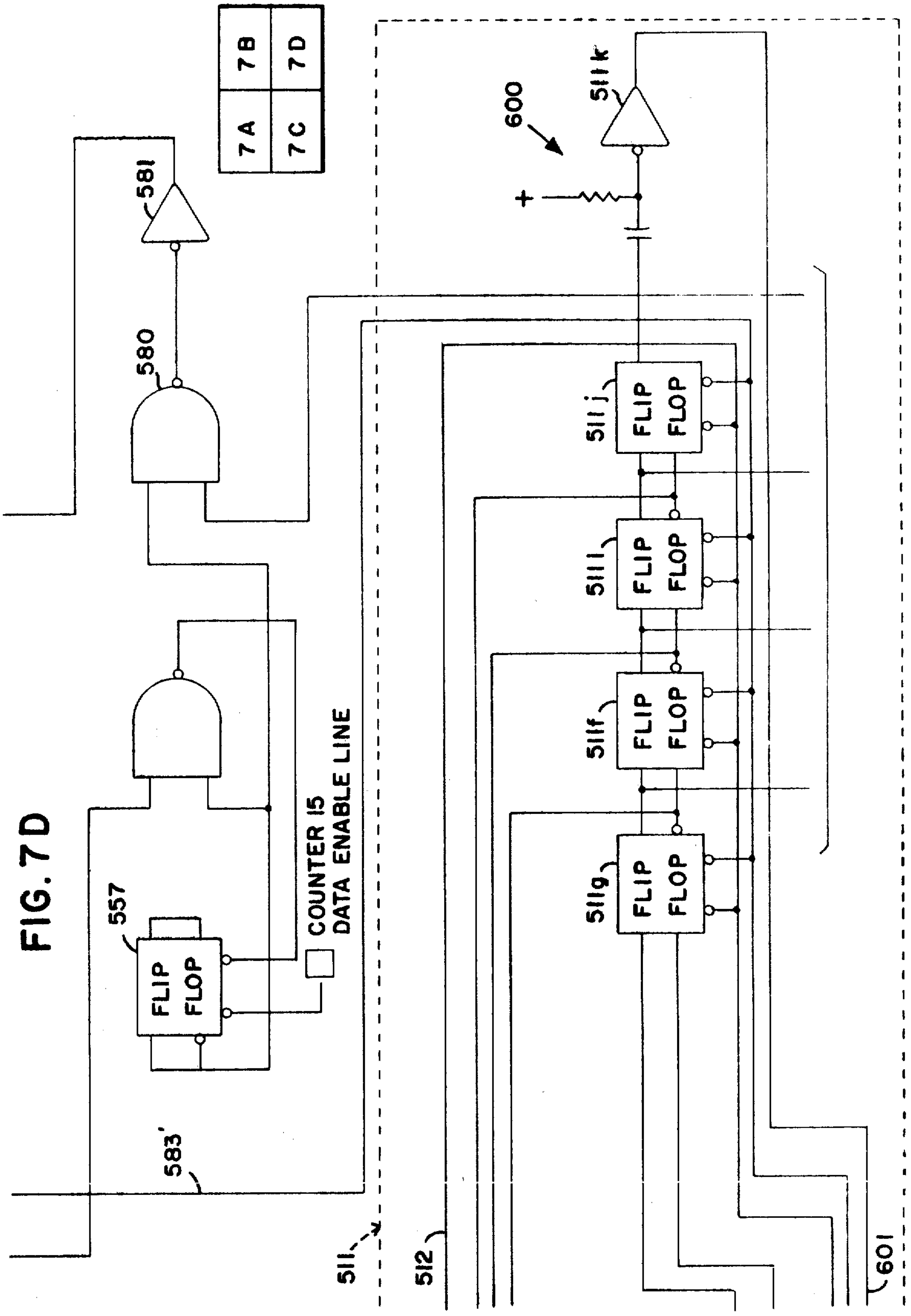

Illustrated in FIGS. 7A and 7B is the start-stop circuit 450 for controlling the apparatus of the present invention. The circuit 450 comprises an OR gate 451 connected on the input side to a pair of terminals 452 and 453 on which are applied start signals. Start signals can originate from a start key on the front panel or by producing a start pulse from the plugboard. The output of the OR gate 451 is connected to one input of an AND gate 455. The other input of the AND gate 455 is connected to a terminal 456. An end-of-tape (EOT) latch signal may be applied to the terminal 456. Should there be tape in the magnetic tape unit 30, then the AND gate 455 is disabled by the absence of an end-of-tape latch signal on the terminal 456. Thus, a start signal on the terminal 452 or terminal 453, and an absence of an end-of-tape latch signal on the terminal 456 causes the AND gate 455 to be active.

Connected to the output of the AND gate 455 is an OR gate 457, which in turn is connected to a start-stop latch OR gate 458. The output of the OR gate 458 is connected to a start terminal 459. When the OR gate 458 is active, a signal is transmitted by way of the terminal 459 to establish a start latch signal to commence a start mode for the apparatus 10 of the present invention.

The output of the OR gate 457 is also connected to an AND gate 460. The output of the AND gate 460 extends to a pair of inverter circuits 461 and 462 and to a stop gate terminal 463. When the OR gate 457 is active, the AND gate 460 is active to transmit start signals through the inverters 461 and 462 for application to a start gate terminal 464 and to a terminal 465 that goes to the start gates of the counter boards 200. This action enables the counters to count. when the start mode begins, the counters will operate and normal operations will take place except for the recording on the tape unit 30. At the same time, a stop gate signal is removed from the terminal 463.

The start-stop circuit 450 also includes a three-input OR gate 466. The input side of the OR gate 466 is connected to three input terminals 467, 468 and 469. Stop signals may be applied to the terminals 467 and 468 by actuating a stop key on the front panel or by producing a stop signal on the patchboard. Applied to the terminal 469 is a stop signal originating from the master reset key (MR) or from a master reset output described hereinafter. The output of the OR gate 466 is connected to an inverter circuit 470, which in turn is connected to one input of a stop latch OR gate 471. The other input of the stop latch OR gate 471 is connected to the terminal 456.

When the OR gate 466 is active by means of actuating a stop key, by generating a stop signal, or by actuating the master reset button, the stop latch OR gate 471 is active. When an end-of-tape (EOT) signal is applied to the terminal 456 from the tape unit 30, the stop latch OR gate 471 is active. The output of the OR gate 471 is connected to an inverter circuit 472, which in turn is connected to another input of the start-stop latch OR gate 458.

During the time the stop latch OR gate 471 is active from any one or more of the aforementioned conditions, the OR gate 458 is inactive to remove the start signal from the terminal 459. As a consequence of the OR gate 458 being inactive, the OR gate 457 is inactive. This results in the AND gate 460 being inactive to remove the start signals from the terminals 464 and 465, and also to apply a stop gate signal to the terminal 463. The scanning of the counters and the operation of the counters will stop.

In the event it is desired to stop the operation of the counter boards 200 while permitting the remainder of the apparatus to be operative, a signal may be applied to the terminal 473, which inhibits the operation of the AND gate 460. As a consequence thereof, start signals are not transmitted through the inverter circuits 461 and 462 for application to the terminals 465 and 464, and the AND gate 460 produces a stop gate signal for application to the terminal 463.

To reset the entire apparatus 10 through the logic control circuit illustrated in FIGS. 7A—7D, a master reset signal (MRS) is applied to a terminal 475 from the reset key on the front panel, which activates an OR gate 476. The output of the OR gate 476 is connected to an inverter circuit 477, which in turn is connected to a one-shot multivibrator 478. A reset hub 475' from the plugboard is connected to the OR gate 476 and serves to produce the same operations as does the reset key on the front panel. Thus, each reset pulse applied to the terminal 475 or the hub 475' causes the one-shot multivibrator 478 to change its state to produce in its output a pulse, e.g. a 10-microsecond output pulse. The output pulses from the multivibrator 478 activates an OR gate 479 so that master reset pulses advance through inverter circuits 480 and 481 for transmission through the entire apparatus 10 over a conductor 482.

As previously described, the master reset signal can be applied to the OR gate 466 over a conductor 483 to apply a stop signal to the OR gate 466. Thus, a master reset signal can be applied directly to the terminal 469 for transmission to the OR gate 466 or can be internally produced by the multivibrator 478 for application as a stop signal to the OR gate 466 over the conductor 483. When the OR gate 501 is activated, the signal is transmitted through the inverter circuit 502 to inhibit the AND gate 492. The signal from an AND gate 526 is transmitted through an inverter circuit 533 to activate an AND gate 535 to enable an OR gate 536, thereby transmitting a signal through an inverter circuit 537 to the ring counter circuit 511 including the flip-flop circuits 511*a*—411*j*, the AND gates 511*l* and 511*m*, and the inverter circuits 511*n* and 511*o*. When the ring counter circuit 511 is activated, the flip-flop circuits 511*a*—511*j* change their state to scan the buffer outputs, not shown, for presentation to the magnetic tape unit 30. As the flip-flop circuit 511*j* is reset, a pulse is generated by a differentiating network 600 and transmitted through the inverter circuit 511*k* over a conductor 601 to the flip-flop circuits 510*a*—510*e* thereof to scan the counter boards 200 to present their information to the buffer, not shown, for further presentation to the magnetic tape unit 30.

Illustrated in 7B is a set of five one-shot multivibrators 520—524 which generate control pulses to reset the buffer, not shown, to load the buffer and to drive information to the magnetic tape unit 30.

The output of the OR gate 536 drives the one-shot multivibrator 521, one of the outputs transmitted through an AND gate 540 and inverters 541 and 542 to the counter boards 200 to provide a select line to enable data to be strobed out of the counter board 200. The other output of the one-shot multivibrator 521 starts the one-shot multivibrator 522, the output of the one-shot multivibrator 522 is transmitted through an AND gate 544 and inverters 544', 550, 551, 552 and 553 to provide the reset pulse for the buffer, not shown. The output of the one-shot multivibrator 522 also drives the one-shot multivibrator 523, one of the outputs thereof is transmitted through an AND gate 573 and inverters 574 a and 575 to strobe the header data. The other output of the one-shot multivibrator 523 is transmitted through inverters 570 and 571 to strobe the counter board data. The output of the inverter 537 aside from driving the ring counter 511, also drives the one-shot multivibrator 520 which provides a time delay before driving the one-shot multivibrator 524 the output of which is transmitted through inverters 530 and 531 to provide the data strobe pulses to the magnetic tape unit 30. The output of the one-shot multivibrator 524 also drives an AND gate 532, the output of which is transmitted over conductor 583 through an OR gate 582 and an inverter 583'' to reset the latch comprising OR gates 493 and 494. The other input to the AND gate 532 is derived from a flip-flop 557, through an AND gate 580 and through an inverter 581. This signal occurs when the last counter board has been scanned.

To mark the end of file, an end-of-file signal (EOF) is applied to a terminal 590 or a terminal 591 (FIG. 7A), which can be applied by a pushbutton or a hub on the plugboard (FIG. 4). Connected to the terminals 590 and 591 is an OR gate 592, which when active activates an AND gate 593. The output of the AND gate 593 is connected to a single-shot multivibrator 594, which has its output connected to an inverter circuit 595. Thus, the OR gate 592, when active, causes the AND gate 593 to be active. This results in the multivibrator 594 changing its state to produce a 5-microsecond signal for advancement through an inverter circuit 595 and for application to a terminal 596. The 5 -microsecond pulse on the terminal 596 i transmitted to the magnetic tape unit 30 as a write file mark (WF). The magnetic tape unit 30 in receiving the write file mark (WF) causes the tape thereof to advance a predetermined distance to record a file mark that can be recognized by a computer connected to the magnetic tape unit 30.

I claim:

1. An isolation probe comprising a plurality of conductors wound around one another, a plural inversion network connected to said conductors for transmitting signals thereover, an amplifier connected to said inversion network, and means connected to said amplifier for sensing signals and for applying sensed signals thereto.

2. An isolation probe as claimed in claim 1 wherein said amplifier is a differential amplifier.

3. An isolation probe as claim in claim 2 wherein said means senses digital signals.

4. An isolation probe as claimed in claim 3 wherein said means includes a compensating network to provide noise rejection and a balanced input for said differential amplifier.

5. An isolation probe as claimed in claim 4 wherein said inversion network is a double inversion network and said conductors are a twisted cable pair.

6. A system utilization monitor apparatus comprising, in combination:

an input section having isolation probe means for sensing the presence and absence of signals within data processing equipment to be monitored;

logic circuit network for performing logical combinations of the signals sensed by said probes; and accumulator and display means for counting and displaying the event occurrence or duration of signals from the logic circuit network, said isolation probe means comprises a plurality of conductors wound around one another, a plural inversion network connected to said conductors for transmitting signals thereover, an amplifier connected to said inversion network, and means connected to said amplifier for sensing signals and for applying sensed signals thereto.

7. A system as claimed in claim 6 wherein said amplifier is a differential amplifier.

8. A system as claimed in claim 7 wherein said means of said isolation probe means senses digital signals.

9. A system as claimed in claim 8 wherein said means of said isolation probe means includes a compensating network to provide noise rejection and a balanced input for said differential amplifier.

10. A system as claimed in claim 9 wherein said inversion network is a double inversion network and said conductors are a twisted cable pair.